(12) United States Patent
Cunningham et al.

(10) Patent No.: US 8,566,208 B1
(45) Date of Patent: Oct. 22, 2013

(54) BIMODAL COMPUTER-BASED SYSTEM FOR SELLING FINANCIAL PRODUCTS

(75) Inventors: Christopher J. Cunningham, La Jolla, CA (US); Matthew D. Kojis, San Diego, CA (US)

(73) Assignee: Leadfusion Incorporated, San Diego, CA (US)

( * ) Notice: Subject to any disclaimer, the term of this patent is extended or adjusted under 35 U.S.C. 154(b) by 0 days.

(21) Appl. No.: 13/615,352

(22) Filed: Sep. 13, 2012

Related U.S. Application Data

(60) Provisional application No. 61/699,769, filed on Sep. 11, 2012.

(51) Int. Cl.
*G06Q 40/00* (2012.01)

(52) U.S. Cl.
USPC .......................................... 705/36 R; 705/35

(58) Field of Classification Search
USPC ..................................................... 705/35–45
See application file for complete search history.

(56) References Cited

U.S. PATENT DOCUMENTS

| | | | |
|---|---|---|---|
| 6,963,826 B2 | 11/2005 | Hanaman et al. | |
| 7,370,004 B1 | 5/2008 | Patel et al. | |
| 7,949,574 B2 | 5/2011 | Patel et al. | |
| 8,234,169 B2 | 7/2012 | Fraser | |
| 2002/0077998 A1 | 6/2002 | Andrews et al. | |
| 2002/0107767 A1 | 8/2002 | McClair et al. | |
| 2009/0024453 A1 | 1/2009 | Fraser | |
| 2009/0281953 A1 | 11/2009 | Ruskowski | |
| 2010/0042533 A1 | 2/2010 | Rose et al. | |
| 2011/0320238 A1* | 12/2011 | Niheu et al. | 705/7.24 |

* cited by examiner

*Primary Examiner* — Richard C Weisberger
(74) *Attorney, Agent, or Firm* — Wilson, Sonsini, Goodrich & Rosati

(57) ABSTRACT

Disclosed are computer-implemented systems and software comprising a software module configured to provide financial product education, research, and recommendation tools, the tools operating in a self-service mode adapted for use by a consumer; a software module configured to provide the financial product education, research, and recommendation tools, the tools operating in a collaboration mode, the collaboration mode comprising a sales overlay adapted for use by a sales representative; and a software module configured to generate a unique code for the consumer, the code providing persistence of state and data information between the self-service mode and the collaboration mode across locations and interfaces without authentication. Also disclosed are methods of making and using the same.

26 Claims, 20 Drawing Sheets

BIMODAL COMPUTER-BASED SYSTEM FOR SELLING FINANCIAL PRODUCTS

CROSS REFERENCE TO RELATED APPLICATIONS

This application claims the benefit of U.S. Application Ser. No. 61/699,769, filed Sep. 11, 2012, which is hereby incorporated by reference in its entirety.

BACKGROUND OF THE INVENTION

Financial services are economic services provided by the finance industry, which encompasses a broad range of organizations that manage money. Financial services are offered by organizations such as credit unions, banks, credit card companies, insurance companies, consumer finance companies, stock brokerages, investment funds and some government sponsored enterprises. In many cases, financial services sales representatives help connect buyers and sellers in markets for financial products.

SUMMARY OF THE INVENTION

Financial products and services, by nature, play key roles in major parts of consumers' lives such as savings, education, housing, transportation, entrepreneurship, retirement, and the like. The decision to purchase a financial product or service is complex, requiring weeks or months of consideration. Consumers faced with the decision to purchase a financial product or service frequently consult a range of available sources of information prior to making a choice. In many cases, a consumer conducts research online and by conferring with friends and family and subsequently seeks the assistance of a financial service representative to make their purchase. Frequently, a consumer makes more than one visit to a branch location during the decision making process.

Currently available technology fails to allow consumers of financial products and services to compile research that is persistent and portable across locations and channels. Moreover, current technology fails to allow consumers to break from the decision making process and reengage at will. Because of these failures, traditional tools fail to address the needs of financial product and service consumers and do not facilitate effective and efficient sales. Traditional Sales Force Automation (SFA) systems, for example, focus entirely on convenience and efficiency of sales representatives, offering no features directed to customers and/or consumers.

Accordingly, there is a long-felt and unmet need for truly cross-channel financial product education, research, and recommendation tools that offer consumers both the ability to work independently to gain knowledge and comfort with their available options and the ability to collaborate with a financial services representative while preserving their accumulated information and choices. Importantly, there is a need to accomplish this task without demanding that a consumer create an account by sharing private personal information during this sensitive decision making process.

Advantages of the software, systems, media, and methods described herein include, but are not limited to, offering guided selling dialogs to consumers of financial products and services that include scripted questions based on best practices. Such dialogs facilitate consumer needs assessment and consumer education as well as provide the opportunity to present relevant and specific product information. Advantages also include, cross-channel portability, without authentication, of independent consumer research and collaborative research completed with financial services representatives. This cross-channel portability of state and data enhances transparency and allows consumers to move between independent and collaborative learning, breaking and reengaging at will, without losing any of their work.

In one aspect, disclosed herein are computer-readable storage media encoded with a computer program including instructions executable by a processor to create an application comprising: a software module configured to provide financial product education, research, and recommendation tools, the tools operating in a self-service mode adapted for use by a consumer; a software module configured to provide the financial product education, research, and recommendation tools, the tools operating in a collaboration mode, the collaboration mode comprising a sales overlay adapted for use by a sales representative; and a software module configured to generate a unique code for the consumer, the code providing persistence of state and data information between the self-service mode and the collaboration mode across locations and interfaces without authentication. In some embodiments, the financial education, research, and recommendation tools, operating in a collaboration mode and accessed via the unique code, comprise pre-populated data and state information collected in a self-service mode. In further embodiments, the financial education, research, and recommendation tools, operating in a collaboration mode, are further accessible by means other than the unique code. In some embodiments, the financial education, research, and recommendation tools, operating in a self-service mode and accessed via the unique code, comprise pre-populated data and state information collected in a collaboration mode. In further embodiments, the financial education, research, and recommendation tools, operating in a self-service mode and accessed via the unique code, comprise contact information for a sales representative with whom a consumer interacted in a collaboration mode. In some embodiments, the financial education, research, and recommendation tools include a question-based needs assessment dialog. In some embodiments, the financial product education, research, and recommendation tools include a financial calculator. In various embodiments, the financial product is one or more of: a mortgage product, a home equity loan or home equity line of credit, a small business loan, an auto loan, a personal loan, a personal line of credit, a savings account, a certificate of deposit, a checking account, a money market account, a credit card, a college savings product, a student loan, and a retirement savings plan including an individual retirement account (IRA). In some embodiments, the unique code is an alphanumeric code. In other embodiments, the unique code is a bar code. In further embodiments, the bar code is a two-dimensional bar code. In some embodiments, the sales overlay includes access to a system for capturing consumer contact information. In some embodiments, the sales overlay includes access to marketing collateral for financial products. In some embodiments, the sales overlay includes access to rate quotes and alerts for financial products. In some embodiments, the sales overlay includes access to applications for financial products. In some embodiments, the sales overlay includes access to a system for establishing follow-up appointments and actions. In some embodiments, the sales overlay includes access to a system for sending a collaboration summary. In some embodiments, the application further comprises a software module configured to provide sales reports. In some embodiments, the application further comprises a software module configured to provide games and selling contests to motivate, measure, and incent financial product sales representatives. In some embodiments, the application further comprises a software module configured to provide a tool to find a sales representative based on location. In some embodiments, the application is offered as software as a service (SaaS).

In another aspect, disclosed herein are computer-implemented systems comprising: a digital processing device comprising an operating system configured to perform executable instructions and a memory device; a computer program including instructions executable by the digital processing device to create an application comprising: a software module configured to provide financial product education, research, and recommendation tools, the tools operating in a self-service mode adapted for use by a consumer; a software module configured to provide the financial product education, research, and recommendation tools, the tools operating in a collaboration mode, the collaboration mode comprising a sales overlay adapted for use by a sales representative; and a software module configured to generate a unique code for the consumer, the code providing persistence of state and data information between the self-service mode and the collaboration mode across locations and interfaces without authentication. In some embodiments, the financial education, research, and recommendation tools, operating in a collaboration mode and accessed via the unique code, comprise pre-populated data and state information collected in a self-service mode. In further embodiments, the financial education, research, and recommendation tools, operating in a collaboration mode, are accessible by means other than the unique code. In some embodiments, the financial education, research, and recommendation tools, operating in a self-service mode and accessed via the unique code, comprise pre-populated data and state information collected in a collaboration mode. In further embodiments, the financial education, research, and recommendation tools, operating in a self-service mode and accessed via the unique code, comprise contact information for a sales representative with whom a consumer interacted in a collaboration mode. In some embodiments, the financial product education, research, and recommendation tools include a question-based needs assessment dialog. In some embodiments, the financial product education, research, and recommendation tools include a financial calculator. In various embodiments, the financial products include one or more of: mortgage products, home equity loans or home equity lines of credit, small business loans, auto loans, personal loans, personal lines of credit, savings accounts, certificates of deposit, checking accounts, money market accounts, credit cards, college savings products, student loans, and retirement savings plans including IRAs. In some embodiments, the unique code is an alphanumeric code. In other embodiments, the unique code is a bar code. In further embodiments, the bar code is a two-dimensional bar code. In some embodiments, the sales overlay includes access to a system for capturing consumer contact information. In some embodiments, the sales overlay includes access to marketing collateral for financial products. In some embodiments, the sales overlay includes access to rate quotes and alerts for financial products. In some embodiments, the sales overlay includes access to applications for financial products. In some embodiments, the sales overlay includes access to a system for establishing follow-up appointments and actions. In some embodiments, the sales overlay includes access to a system for sending a collaboration summary. In some embodiments, the application further comprises a software module configured to provide sales reports. In some embodiments, the application further comprises a software module configured to provide games and selling contests to motivate, measure, and incent financial product sales representatives. In some embodiments, the application further comprises a software module configured to provide a tool to find a sales representative based on location. In some embodiments, the application is offered as SaaS.

In another aspect, disclosed herein are computer-implemented methods comprising the steps of: providing, by a computer, a question-based needs assessment for a financial product, the needs assessment operating in a self-service mode adapted for use by a consumer; providing, by the computer, the question-based needs assessment, the needs assessment operating in a collaboration mode, the assessment comprising a sales overlay adapted for use by the sales representative; and generating, by the computer, a unique code for the consumer, the code providing persistence of state and data information between the self-service mode and the collaboration mode across locations and interfaces without authentication. In some embodiments, the question-based needs assessment, operating in a collaboration mode and accessed via the unique code, comprises pre-populated data and state information collected in a self-service mode. In further embodiments, the question-based needs assessment, operating in a collaboration mode, is further accessible by means other than the unique code. In some embodiments, the question-based needs assessment, operating in a self-service mode and accessed via the unique code, comprises pre-populated data and state information collected in a collaboration mode. In further embodiments, the question-based needs assessment, operating in a self-service mode and accessed via the unique code, comprises contact information for a sales representative with whom a consumer interacted in a collaboration mode. In some embodiments, the unique code is an alphanumeric code. In other embodiments, the unique code is a bar code. In further embodiments, the bar code is a two-dimensional bar code. In some embodiments, the sales overlay includes access to a system for capturing consumer contact information. In some embodiments, the sales overlay includes access to marketing collateral for financial products. In some embodiments, the sales overlay includes access to rate quotes and alerts for financial products. In some embodiments, the sales overlay includes access to applications for financial products. In some embodiments, the sales overlay includes access to a system for establishing follow-up appointments and actions. In some embodiments, the sales overlay includes access to a system for sending a collaboration summary.

In another aspect, disclosed herein are computer-readable storage media encoded with a unique code, the code providing persistence between locations and interfaces without authentication between operating modes of a web application, the web application configured to provide financial product education, research, and recommendation tools, the operating modes comprising: a) an self-service mode, the self-service mode adapted for use by a consumer; and b) a collaboration mode, the collaboration mode comprising a sales overlay adapted for use by a sales representative. In some embodiments, the unique code provides persistence of data and state information between a self-service mode and a collaboration mode. In some embodiments, the unique code is an alphanumeric code. In other embodiments, the unique code is a bar code. In further embodiments, the bar code is a two-dimensional bar code.

In another aspect, disclosed herein are computer-readable storage media encoded with a sales overlay, the sales overlay adding functionality to a suite of consumer education, research, and recommendation tools for financial products, the sales overlay activated by entry of a unique code provided to a consumer, the sales overlay adapted for use by a sales representative. In some embodiments, the sales overlay is optionally activated by means other than entry of a unique code provided to a consumer. In some embodiments, the consumer education, research, and recommendation tools for financial products include a question-based needs assessment dialog. In some embodiments, the consumer education, research, and recommendation tools for financial products include a financial calculator. In various embodiments, the financial products include one or more of: mortgage products, home equity loans or home equity lines of credit, small business loans, auto loans, personal loans, personal lines of credit, savings accounts, certificates of deposit, checking accounts, money market accounts, credit cards, college savings products, student loans, and retirement savings plans including IRAs. In some embodiments, the unique code is an alphanumeric code. In other embodiments, the unique code is a bar code. In further embodiments, the bar code is a two-dimensional bar code. In some embodiments, the sales overlay includes access to a system for capturing consumer contact information. In some embodiments, the sales overlay includes access to marketing collateral for financial products. In some embodiments, the sales overlay includes access to rate quotes and alerts for financial products. In some embodiments, the sales overlay includes access to applications for financial products. In some embodiments, the sales overlay includes access to a system for establishing follow-up appointments and actions. In some embodiments, the sales overlay includes access to a system for sending a collaboration summary.

BRIEF DESCRIPTION OF THE DRAWINGS

FIG. 3 shows a non-limiting example of a financial product education, research, and recommendation tool operating in a self-service mode adapted for use by a consumer; in this case, a tool for comparing and evaluating auto loan products that includes an interface element for requesting contact with a financial service representative.

FIG. 7 shows a non-limiting example of a financial product education, research, and recommendation tool operating in a consumer/service representative collaboration mode; in this case, a tool for comparing and evaluating auto loan products that includes an interface element for activating a sales overlay adapted for use by a financial service representative.

FIG. 8 shows a non-limiting example of a sales overlay adding functionality to a suite of financial product education, research, and recommendation tools; in this case, a sales overlay adapted for use by a financial service representative and including a GUI for entering consumer contact information.

FIG. 19 shows a non-limiting example of a financial product education, research, and recommendation tool operating in a self-service mode adapted for use by a consumer; in this case, a tool for comparing and evaluating auto loan products operating in a self-service mode and accessed via a unique code to include pre-populated data and state information.

DETAILED DESCRIPTION OF THE INVENTION

Figure 1:
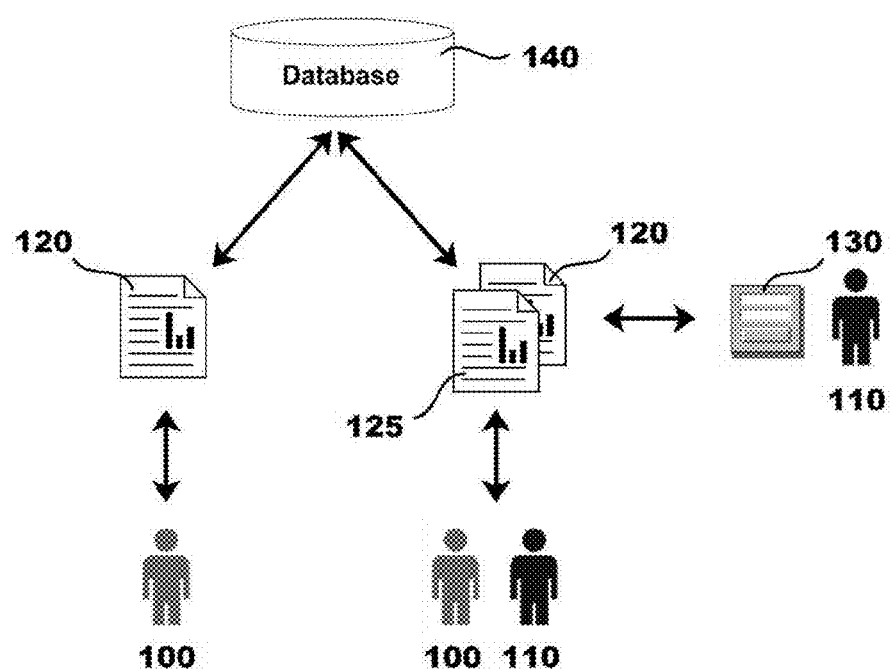
FIG. 1 shows a non-limiting, exemplary schematic diagram of a computer-implemented system for selling financial products described herein; in this case, a system including a suite of financial product education, research, and recommendation tools capable of operating in both a consumer self-service mode and a collaboration mode, which further includes a financial product sales overlay adapted for use by a financial service representative.

Existing tools and technologies for selling financial products and services fail to offer cross-channel portability, without authentication, of independent (e.g., self-service) consumer research and collaborative research completed with financial services representatives. Sales are not adequately effective or efficient because consumers may not move between independent and collaborative learning modes, breaking and reengaging from the process at will, without losing any of their work.

Described herein, in certain embodiments, are computer-readable storage media encoded with a computer program including instructions executable by a processor to create an application comprising: a software module configured to provide financial product education, research, and recommendation tools, the tools operating in a self-service mode adapted for use by a consumer; a software module configured to provide the financial product education, research, and recommendation tools, the tools operating in a collaboration mode, the collaboration mode comprising a sales overlay adapted for use by a sales representative; and a software module configured to generate a unique code for the consumer, the code providing persistence of state and data information between the self-service mode and the collaboration mode across locations and interfaces without authentication.

Also described herein, in certain embodiments, are computer-implemented systems comprising: a digital processing device comprising an operating system configured to perform executable instructions and a memory device; a computer program including instructions executable by the digital processing device to create an application comprising: a software module configured to provide financial product education, research, and recommendation tools, the tools operating in a self-service mode adapted for use by a consumer; a software module configured to provide the financial product education, research, and recommendation tools, the tools operating in a collaboration mode, the collaboration mode comprising a sales overlay adapted for use by a sales representative; and a software module configured to generate a unique code for the consumer, the code providing persistence of state and data information between the self-service mode and the collaboration mode across locations and interfaces without authentication.

Also described herein, in certain embodiments, are computer-implemented methods comprising the steps of: providing, by a computer, a question-based needs assessment for a financial product, the needs assessment operating in a self-service mode adapted for use by a consumer; providing, by the computer, the question-based needs assessment, the needs assessment operating in a collaboration mode, the assessment comprising a sales overlay adapted for use by the sales representative; and generating, by the computer, a unique code for the consumer, the code providing persistence of state and data information between the self-service mode and the collaboration mode across locations and interfaces without authentication.

Also described herein, in certain embodiments, are computer-readable storage media encoded with a unique code, the code providing persistence between locations and interfaces without authentication between operating modes of a web application, the web application configured to provide financial product education, research, and recommendation tools, the operating modes comprising: a) an self-service mode, the self-service mode adapted for use by a consumer; and b) a collaboration mode, the collaboration mode comprising a sales overlay adapted for use by a sales representative.

Also described herein, in certain embodiments, are computer-readable storage media encoded with a sales overlay, the sales overlay adding functionality to a suite of consumer education, research, and recommendation tools for financial products, the sales overlay activated by entry of a unique code provided to a consumer, the sales overlay adapted for use by a sales representative.

CERTAIN DEFINITIONS

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Financial Products and Services

In some embodiments, the software, systems, media, and methods described herein are for selling financial products and/or services. In further embodiments, the software, systems, media, and methods described herein include a software module configured to provide financial product/service education, research and recommendation tools, or use of the same. A wide range of financial products and financial services are suitable.

In various embodiments, suitable financial products include, by way of non-limiting examples, mortgage products, home equity loans or home equity lines of credit, small business loans, vehicle loans, personal loans, personal lines of credit, savings accounts, certificates of deposit, checking accounts, money market accounts, credit cards, college savings products, student loans, retirement savings plans, and the like. In further embodiments, suitable mortgage products include, for example, new purchase mortgages, refinance mortgages, fixed-rate mortgages, adjustable-rate mortgages, reverse mortgages, and the like with a wide range of principal amounts and interest rates. In further embodiments, suitable vehicle loan products include, for example, car loans, motorcycle loans, recreational vehicle loans, aircraft loans, and the like. In further embodiments, suitable CD products include, for example, fixed-rate CDs, adjustable-rate CDs, and the like with a wide range of principal amounts and terms. In further embodiments, suitable college savings products include, for example, Section 529 Accounts, Coverdell Education Savings Accounts, UGMA/UTMA Custodial Accounts, and the like. In further embodiments, suitable retirement savings products include, for example, IRAs, Roth IRAs, 401(k)

Plans, 403(b) Plans, SIMPLE IRA Plans, SEP Plans, SARSEP Plans, Defined Benefit Plans, Money Purchase Plans, and the like.

In various embodiments, suitable financial services include, by way of non-limiting examples, banking services, financial planning, advising, consulting, investing, or asset management services, insurance or reinsurance services, electronic fund transfer and wire transfer services, currency exchange services, and the like.

Financial Product and Service Tools

In some embodiments, the software, systems, media, and methods described herein include a software module configured to provide financial product/service education, research and recommendation tools, or use of the same. In further embodiments, the tools allow a consumer to, for example, learn about financial products and/or services, compare financial products and/or services, or purchase financial products and/or services. In some embodiments, the financial product/service education, research and recommendation tools operate in a self-service mode. In further embodiments, a self-service mode is adapted for use by a consumer. In some embodiments, the financial product/service education, research and recommendation tools operate in a collaboration mode. In further embodiments, a collaboration mode is adapted for use by a consumer in collaboration with a financial service representative (e.g., where the consumer and the service representative are present together).

Referring to FIG. 1, in a particular embodiment, a consumer of financial products and/or services 100 accesses financial product/service education, research and recommendation tools 120, either in a self-service mode or in a collaborative mode with a financial service representative 110. In a collaboration mode, a sales overlay 125, adapted for use by the service representative 110, adds functionality to the tools 120. Data collected in all modes is stored in one or more databases 140, including, for example, a cloud computing-based data storage system. A financial service representative 110 also optionally accesses the financial product/service education, research and recommendation tools 120 and the sales overlay 125 via a specialized representative access point 130.

In some embodiments, the financial education, research, and recommendation tools include a question-based needs assessment dialog. In further embodiments, a question-based needs assessment dialog is a guided selling protocol. As used herein, "guided selling" of financial products combines interactive educational tools with comparative product information to help consumers evaluate their financial product options, thereby accelerating conversion. In some embodiments, a question-based needs assessment dialog or a guided selling protocol is based on the financial goals of the consumer. Many goal-based dialogs and/or protocols are suitable. In some embodiments, suitable question-based needs assessment dialogs or guided selling protocols are deposit dialogues including, by way of non-limiting examples, save for a rainy day, save for a college education, save for retirement, save for a major purchase, evaluate savings accounts and CDs, and evaluate checking and money market accounts. In some embodiments, suitable question-based needs assessment dialogs or guided selling protocols are mortgage dialogues including, by way of non-limiting examples, buy my first home, buy a new home, refinance my mortgage, and tap into my home equity. In some embodiments, suitable question-based needs assessment dialogs or guided selling protocols are consumer finance dialogues including, by way of non-limiting examples, consolidate my debt, finance a vehicle purchase, finance a college education, finance a major purchase, evaluate home equity loans and lines of credit, and evaluate credit cards.

In some embodiments, the financial product education, research, and recommendation tools include one or more interactive educational tools. In further embodiments, the interactive educational tools include financial calculators. Many types of financial calculators are suitable. In some embodiments, suitable financial calculators include mortgage calculators. In further embodiments, mortgage calculators include, by way of non-limiting examples, those for determining amortization schedules, home affordability, and refinance savings. In some embodiments, suitable financial calculators include credit calculators. In further embodiments, credit card calculators include, by way of non-limiting examples, those for determining credit card balance transfer savings, credit card pay off schedules, FICO score estimates, and costs of making minimum payments. In some embodiments, suitable financial calculators include investment calculators. In further embodiments, investment calculators include, by way of non-limiting examples, those for determining certificate of deposit earnings, maximization of returns on CDs, 401(k) savings projections, and retirement savings needed. In some embodiments, suitable financial calculators include savings calculators. In further embodiments, savings calculators include, by way of non-limiting examples, those for determining emergency savings estimates, savings goals, and home budgets. In some embodiments, suitable financial calculators include auto calculators. In further embodiments, auto calculators include, by way of non-limiting examples, those for determining monthly auto loan payments, auto loan rate comparisons, buy/lease comparisons, and auto loan down payments. In some embodiments, suitable financial calculators include home equity calculators. In further embodiments, home equity calculators include, by way of non-limiting examples, those for determining home loan-to-value, home equity loan/line of credit comparisons, and debt pay down strategies. In some embodiments, suitable financial calculators include retirement calculators. In further embodiments, retirement calculators include, by way of non-limiting examples, those for determining 401(k) savings, recommended retirement savings, 401(k)/Roth IRA comparisons, and recommended 401(k) and Roth IRA contributions.

Figure 3:
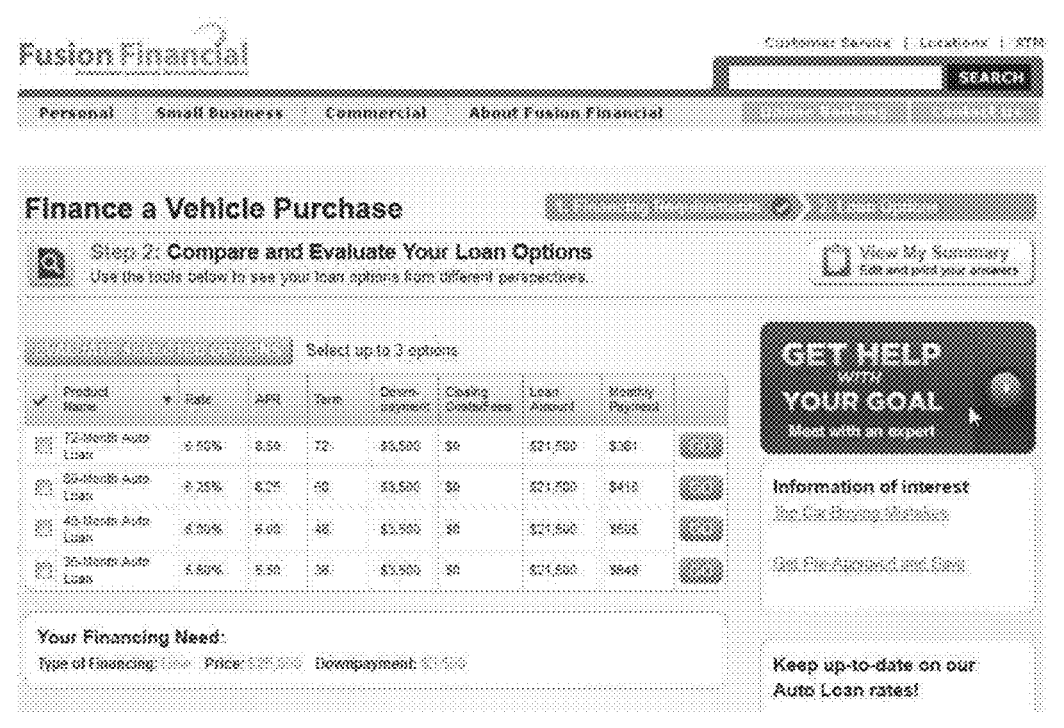

Referring to FIG. 3, in a particular embodiment, a suite of financial product education, research, and recommendation tools includes tools for consumers with a goal of financing a vehicle purchase. In this embodiment, a consumer optionally accesses a vehicle loan comparison tool. Further, in this embodiment, a vehicle loan comparison tool includes an interface for collecting consumer vehicle financing requirements and an interface for comparing relevant, available loan products. In this embodiment, loans are compared with regard to rate, APR, term, down payment, closing costs, loan amount, and monthly payment.

Continuing to refer to FIG. 3, in a particular embodiment, a suite of financial product education, research, and recommendation tools includes an interface element allowing a consumer to request to meet with a financial service representative. In this embodiment, interacting with the interface element for requesting a meeting with a financial service representative triggers generation of a unique code. Further, in this embodiment, the unique code allows the consumer to access, for example, the a vehicle loan comparison tool at a later time, from a different location, or in a different mode of the application (e.g., in a collaboration mode), in a way that preserves the data they have entered, the research they have conducted, and the recommendations they have received, without requiring creation of an account or user authentication.

Unique Code

In some embodiments, the software, systems, media, and methods described herein include a software module configured to generate a unique code for the consumer, or use of the same. In some embodiments, the unique code is an alphanumeric code. In further embodiments, an alphanumeric code includes, for example, letters (including uppercase and/or lowercase letters), numbers, symbols, punctuation, spaces, and the like. An alphanumeric code has any length suitable for providing a unique code to each consumer. In various embodiments, an alphanumeric code has a length of 3, 4, 5, 6, 7, 8, 9, 10, 11, 12, 13, 14, 15, 16, 17, 18, 19, 20 or more characters. In some cases, an alphanumeric code is case sensitive. In other cases, an alphanumeric code is not case sensitive.

In some embodiments, the unique code is a bar code scanable by a processing device. In some embodiments, the bar code is a one-dimensional bar code (e.g., a linear bar code). In further embodiments, the bar code is a Universal Product Code (UPC) code. In other embodiments, the bar code is a two-dimensional bar code. In further embodiments, the bar code is a quick response code or QR Code®, Datamatrix code, or High Capacity Color Barcode (HCCB).

In some embodiments, a unique code described herein provides persistence of state and data information between visits to a web application without authentication, regardless of the time between visits, location, computing device, operating system, or web browser. By way of non-limiting example, a consumer utilizing the financial product education, research, and recommendation tools described herein optionally requests generation of a unique code that allows them to re-access their research and recommendations at a later time or from a different location, without creating a personally identifiable account.

In some embodiments, a unique code described herein provides persistence of state and data information between modes of a web application without authentication. In further embodiments, a unique code described herein provides persistence of state and data information between a self-service mode and a collaboration mode across locations and interfaces without authentication. By way of non-limiting example, a consumer utilizing the financial product education, research, and recommendation tools described herein in a self-service mode optionally requests generation of a unique code that allows them to re-access their research and recommendations in a collaboration mode, without creating a personally identifiable account. By way of alternative non-limiting example, a consumer utilizing the financial product education, research, and recommendation tools described herein in a collaboration mode optionally requests generation of a unique code that allows them to re-access their research and recommendations in a self-service mode, without creating a personally identifiable account.

In some embodiments, a unique code described herein resolves to a means of providing persistence of state and data information within a web application. In further embodiments, a unique code described herein resolves to a URL. In still further embodiments, a unique code described herein resolves to a URL including parameters identifying, for example, a consumer, an account, a profile, a session, and the like.

Figure 2:
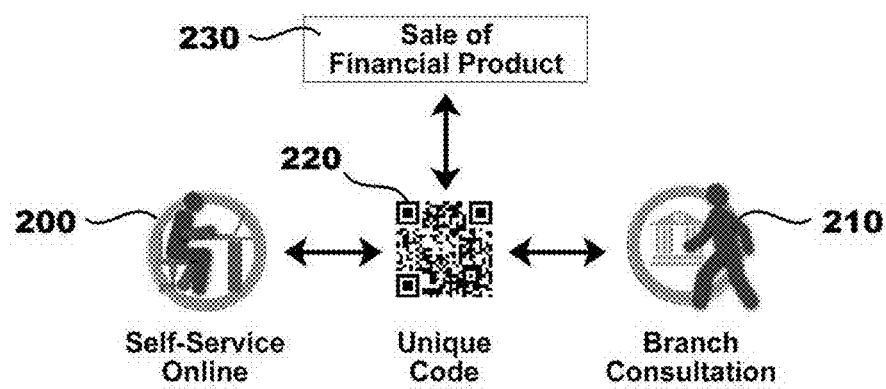
FIG. 2 shows another non-limiting exemplary schematic diagram of a computer-implemented system for selling financial products described herein; in this case, a system wherein a unique code provides persistence of state and data information between a consumer self-service mode and a consumer/service representative collaboration mode across locations and interfaces without authentication.

Referring to FIG. 2, in a particular embodiment, a unique code 220 provides persistence of state and data information between within and between modes of an application for selling financial products 230, without authentication. In this embodiment, the unique code 220 preserves state and data information between sessions in either a consumer self-service mode 200 or a consumer/service representative collaboration mode 210 across locations, devices, web browsers, and interfaces. Moreover, in this embodiment, the unique code 220 preserves state and data information when moving between a consumer self-service mode 200 and a consumer/service representative collaboration mode 210 regardless of location, device, web browser, and interface.

Figure 4:
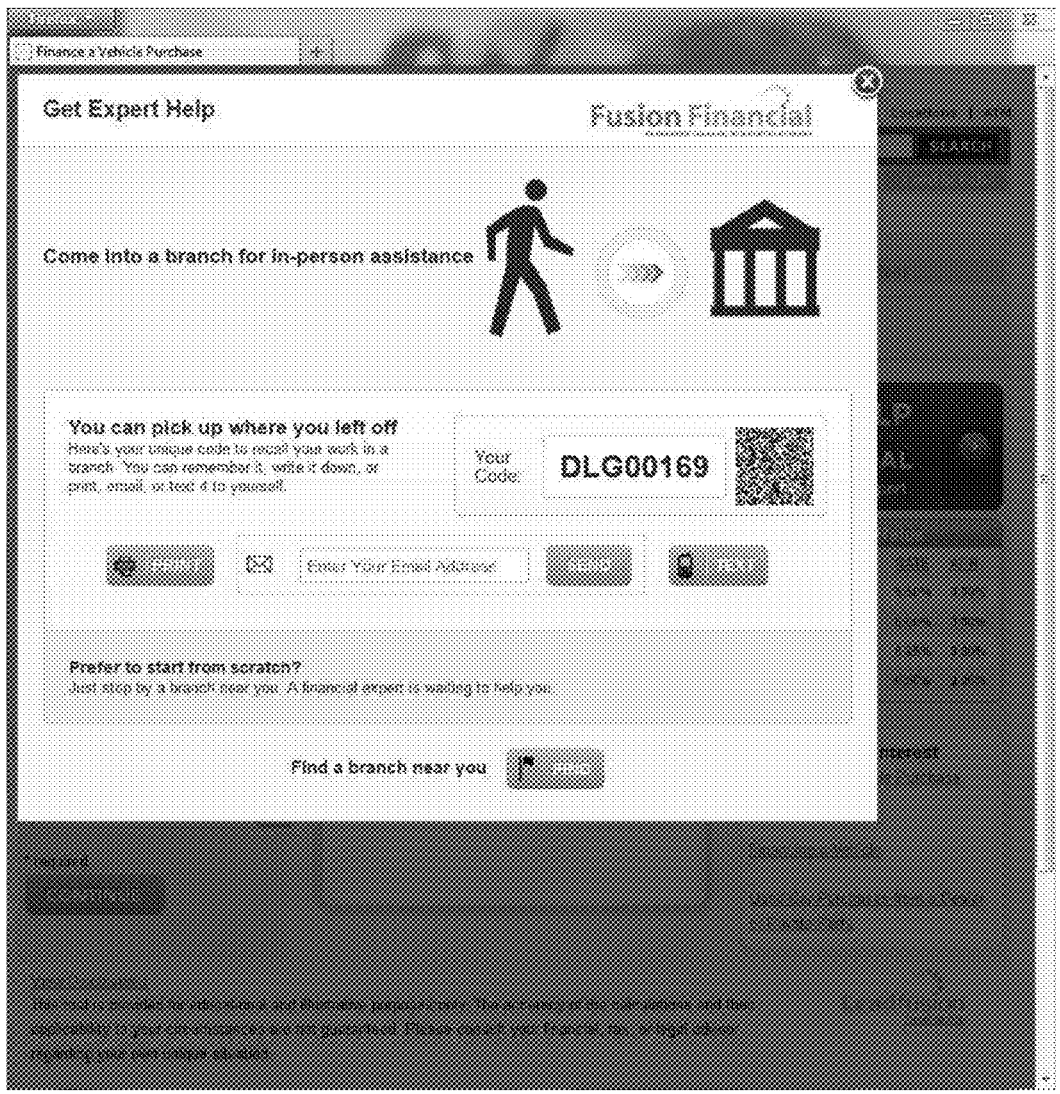
FIG. 4 shows a non-limiting example of a graphic user interface (GUI) for requesting contact with a financial service representative; in this case, a GUI including a unique code, in alphanumeric and two-dimensional bar code formats, the code providing persistence of state and data information between the self-service mode and the collaboration mode across locations and interfaces without authentication.

Referring to FIG. 4, in a particular embodiment, a software module configured to generate a unique code for a consumer generates a code in response to a user request to meet with a financial service representative. In this embodiment, the module provides both an alphanumeric code and a QR code, each of which provide the consumer access to their saved research across modes of the financial product/service education, research and recommendation tools and from any location or device, without authentication.

Figure 18:
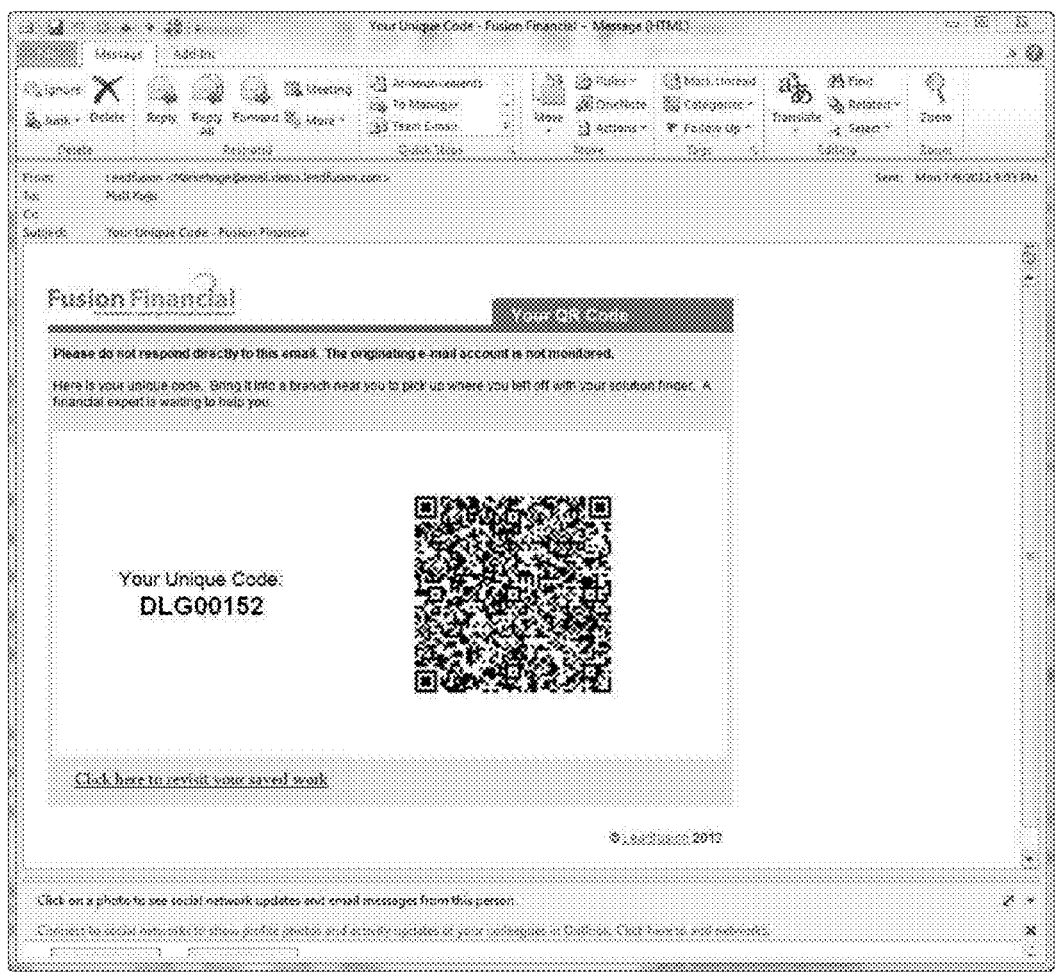
FIG. 18 shows a non-limiting example of a collaboration follow-up email for a consumer; in this case, a follow-up including access to a unique code that provides state and data persistence, without authentication, between self-service and collaboration modes of a web application across locations and devices.

Referring to FIG. 18, in a particular embodiment, a financial service representative optionally uses a sales overlay to generate a follow-up email to a consumer. In this embodiment, the email contains both an alphanumeric code and a QR code, each of which provide the consumer access to their saved research across modes of the financial product/service education, research and recommendation tools and from any location or device, without authentication.

Figure 19:
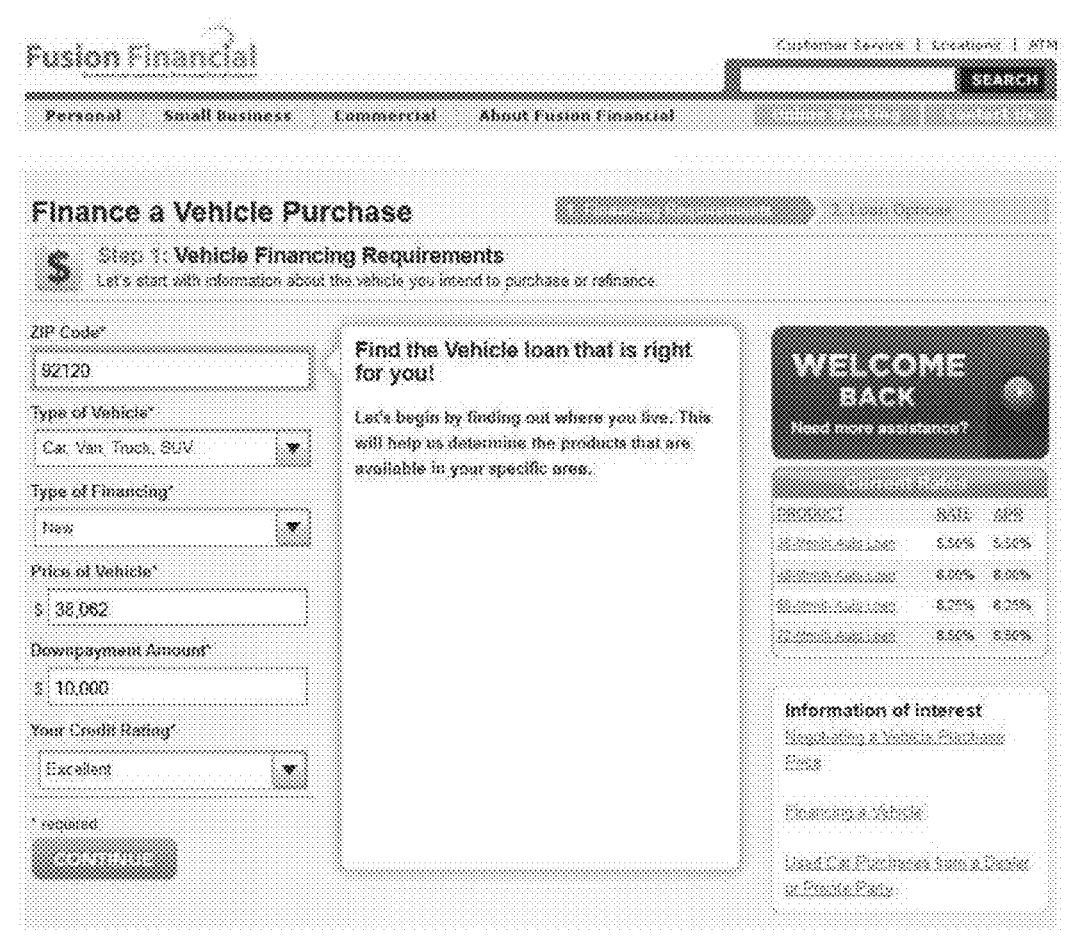

Referring to FIG. 19, in a particular embodiment, a consumer optionally enters (e.g., by typing, scanning, etc.) a unique code provided to re-access their research, from any location or device without authentication.

Figure 20:
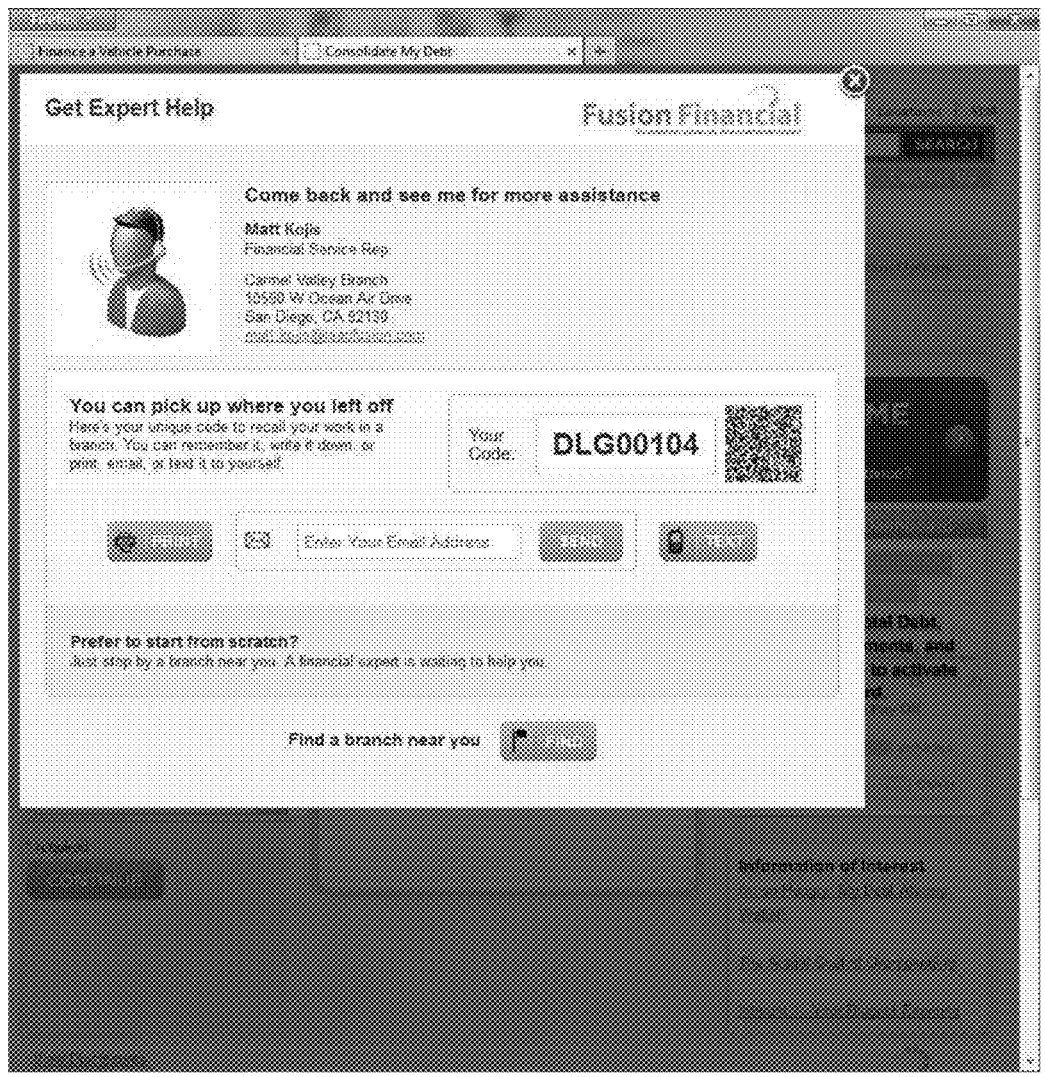
FIG. 20 shows a non-limiting example of a GUI for requesting additional (e.g., second, third, subsequent, etc.) contact with a financial service representative; in this case, a GUI including a unique code, in alphanumeric and two-dimensional bar code formats, the code providing persistence of state and data information between self-service and collaboration modes of a web application across locations and interfaces without authentication.

Referring to FIG. 20, in a particular embodiment, a software module configured to generate a unique code for a consumer generates a code in response to a second user request to meet with a financial service representative.

Sales Overlay

In some embodiments, the software, systems, media, and methods described herein include a sales overlay, or use of the same. In further embodiments, a sales overlay adds functionality to a suite of consumer education, research, and recommendation tools for financial products. In still further embodiments, a sales overlay adapted for use by a financial service representative. In some embodiments, a sales overlay is available in a consumer/service representative collaboration mode described herein.

A sales overlay is suitably activated or access via a wide range of user interactions. In some embodiments, a financial service representative activates a sales overlay by using a pointing device to interact with a GUI element. Suitable pointing devices include, by way of non-limiting examples, mouse, trackball, trackpad, joystick, pen, or stylus. In further embodiments, a financial service representative activates a sales overlay with a pointing device by actions including, by way of non-limiting examples, click, click and hold, double click, right click, shift-click, control-click, command-click, alt-click, drag, draw, and highlight. In some embodiments, a financial service representative activates a sales overlay using a touch screen display or multi-touch screen display. In further embodiments, a financial service representative activates a sales overlay with a touch screen or multi-touch screen by gestures including, by way of non-limiting examples, tap (e.g., touch), double tap, tap and hold, swipe, drag, pinch, reverse pinch, draw, and highlight. In some embodiments, a financial service representative activates a sales overlay using a keyboard, keypad, or alternative text input device, by keystroke, combination of keystrokes, or sequence of keystrokes. In other embodiments, a financial service representative activates a sales overlay using a microphone to capture voice or other sound input. In other embodiments, a financial service representative activates a sales overlay using a video camera to capture motion or visual input.

A sales overlay suitably provides a financial service representative with access to many types of tools useful in the sales process. In various embodiments, a sales overlay suitably provides a financial service representative with access to, by way of non-limiting examples, features for capturing contact information, features for displaying and sharing marketing collateral for financial products, features for configuring rate quotes and alerts for financial products, applications for financial products, features for configuring follow-up appointments and actions, features for providing a collaboration summary, and the like.

Figure 5:
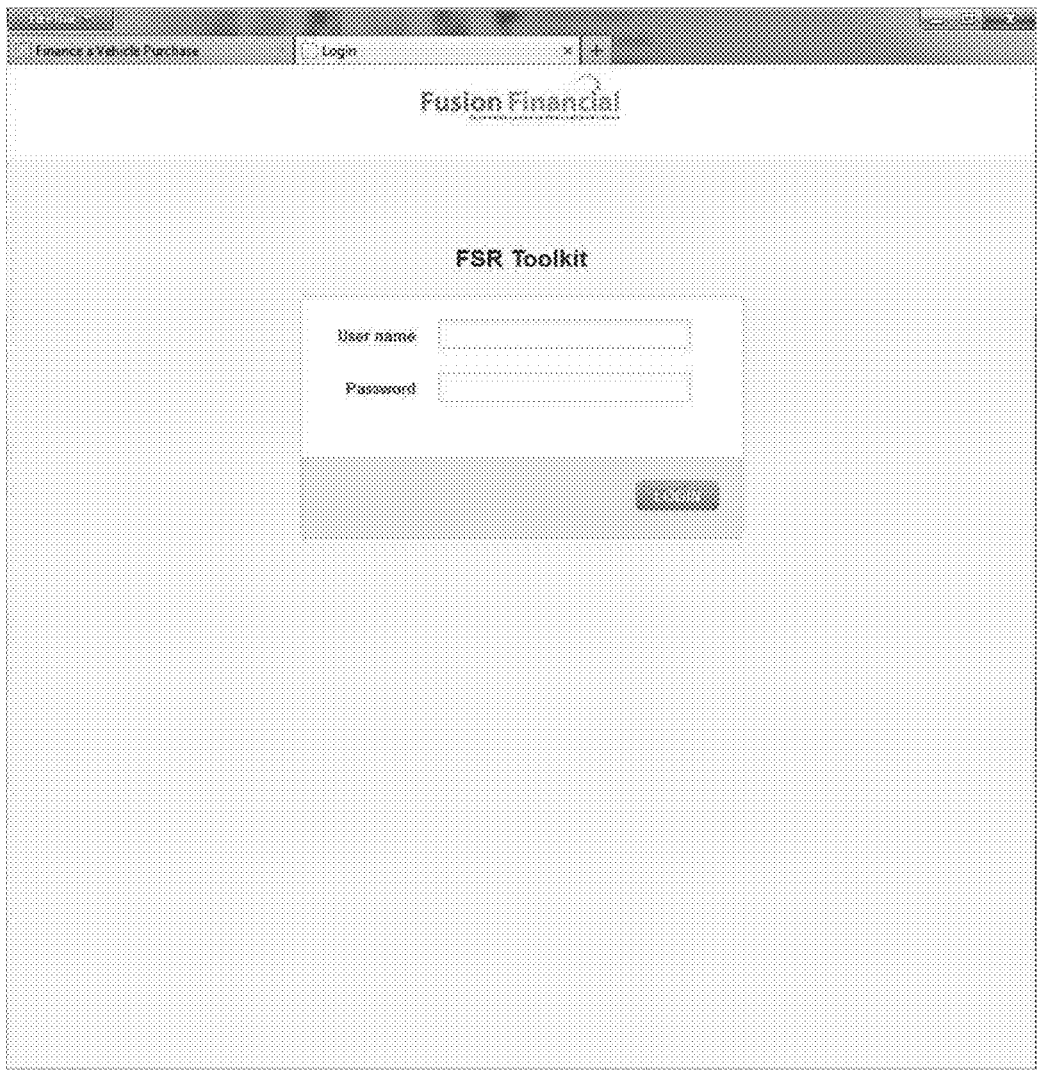
FIG. 5 shows a non-limiting example of a log in screen; in this case, a log in screen for financial service representatives to access a suite of financial product education, research, and recommendation tools.

Referring to FIG. 5, in a particular embodiment, software, systems, and media described herein provide a specialized portal for financial service representatives to log into a suite of consumer education, research, and recommendation tools for financial products. In this embodiment, a financial service representative logs in using unique credentials that identify him or her as a financial service representative.

Figure 6:
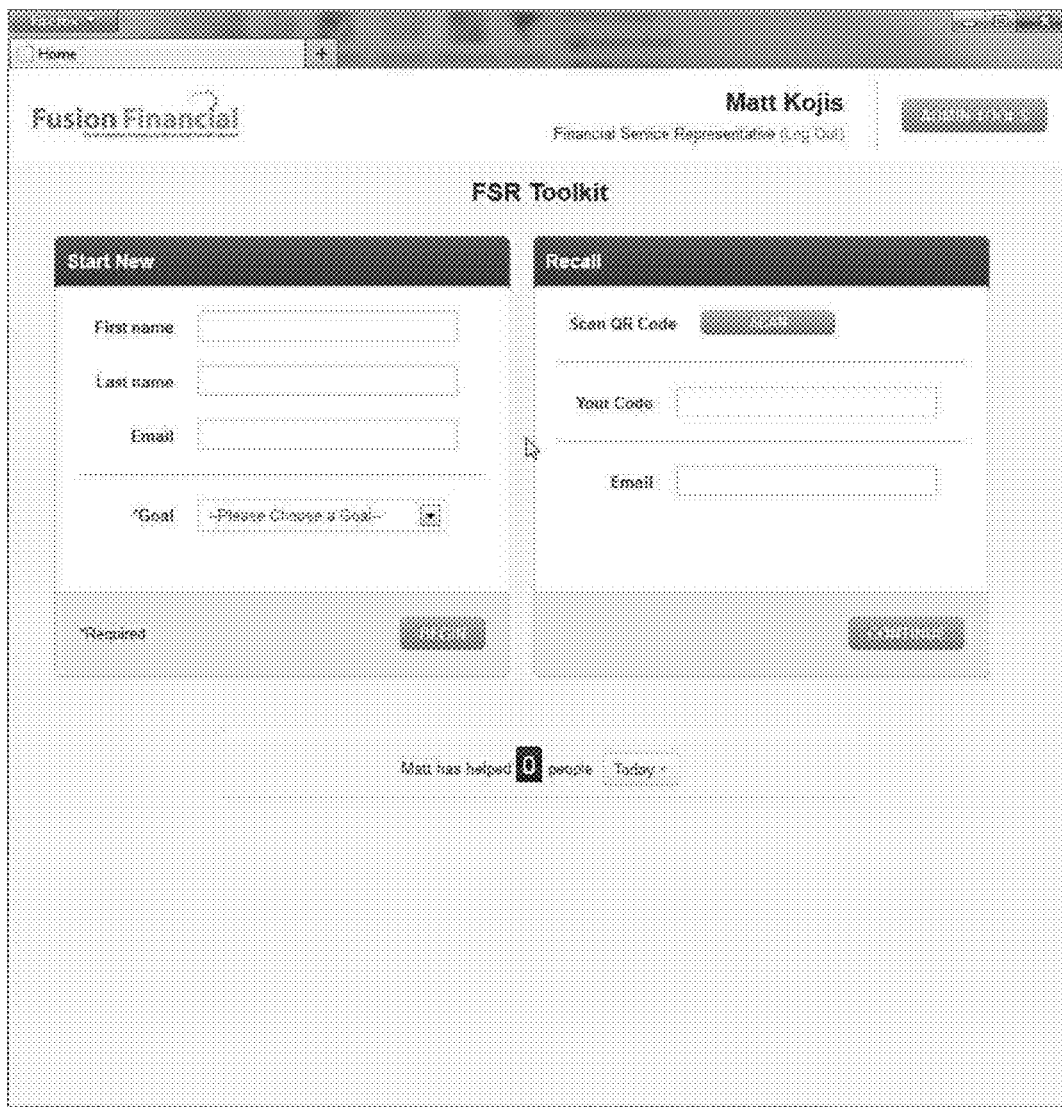
FIG. 6 shows a non-limiting example of a start screen for a financial service representative; in this case, a start screen offering features for a service representative to start a new consumer profile or access, via a unique code, an existing consumer profile.

Referring to FIG. 6, in a particular embodiment, a financial service representative optionally starts a session with either starting a new consumer profile or recalling an existing profile by entering (e.g., typing, scanning, etc.) a unique code provided to a consumer.

Figure 7:
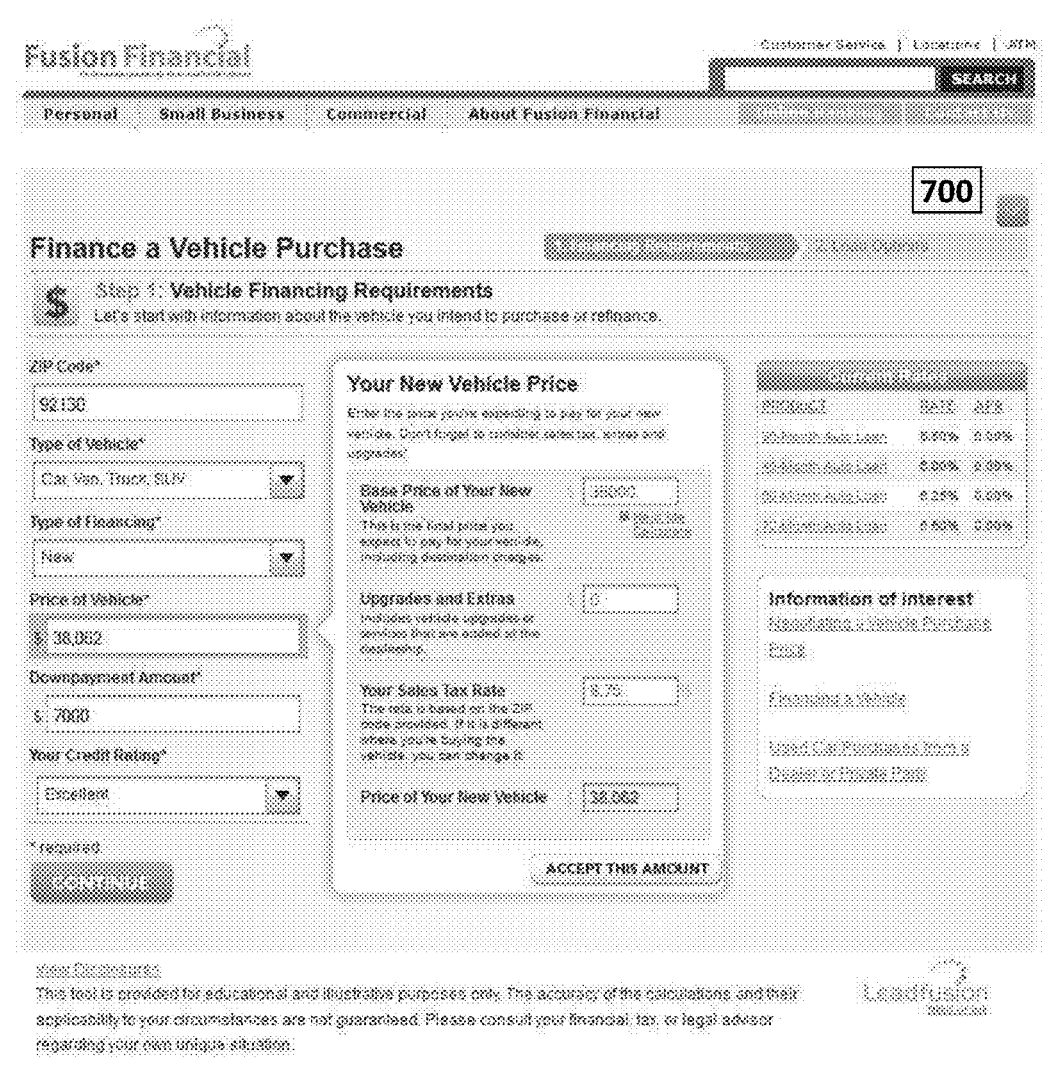

Referring to FIG. 7, in a particular embodiment, a suite of consumer education, research, and recommendation tools for financial products includes a GUI element to optionally activate a sales overlay adapted for use by a financial service representative. In this embodiment, a button 700 at the top right of the interface provides access to a sales overlay.

Figure 8:
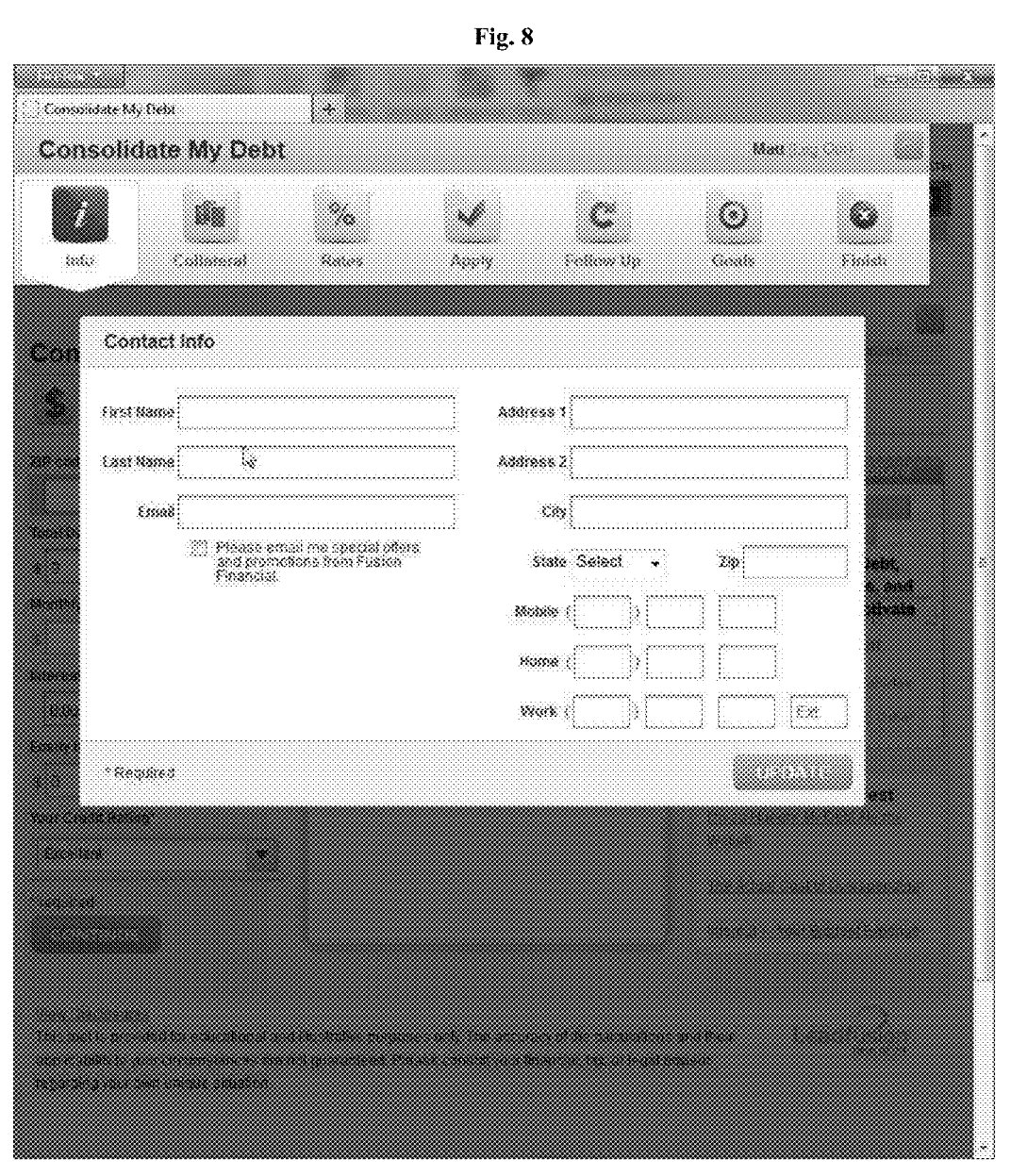

Referring to FIG. 8, in a particular embodiment, a sales overlay is activated, adding functionality to a suite of financial product education, research, and recommendation tools. In this embodiment, the sales overlay includes optional access to tools for entering consumer contact information.

Figure 9:
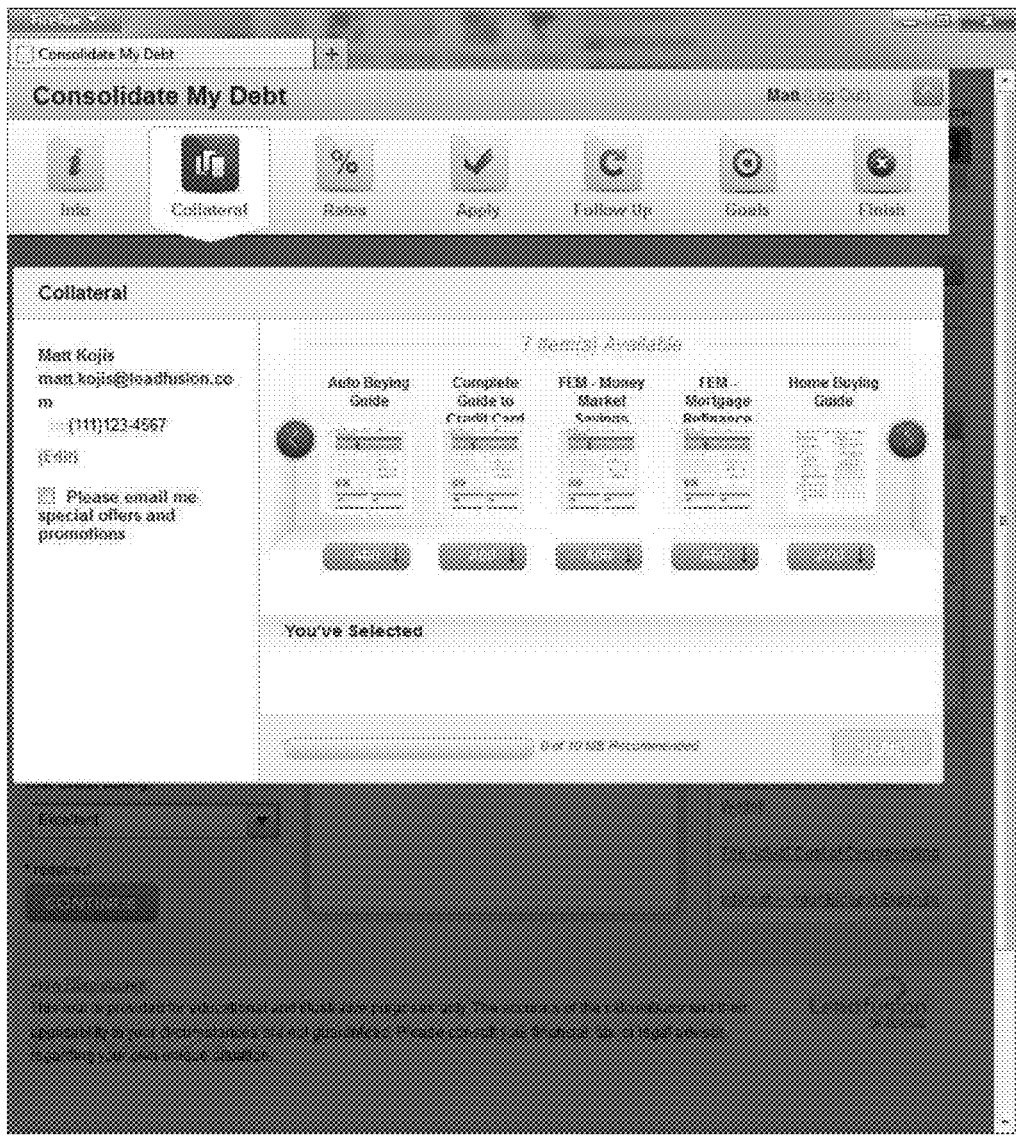
FIG. 9 shows a non-limiting example of a sales overlay adding functionality to a suite of financial product education, research, and recommendation tools; in this case, a sales overlay adapted for use by a financial service representative and including a GUI for providing a consumer with financial product sales collateral.

Referring to FIG. 9, in a particular embodiment, a sales overlay is activated, adding functionality to a suite of financial product education, research, and recommendation tools. In this embodiment, the sales overlay includes optional access to tools for electronically providing a consumer with financial product/service sales/marketing collateral.

Figure 10:
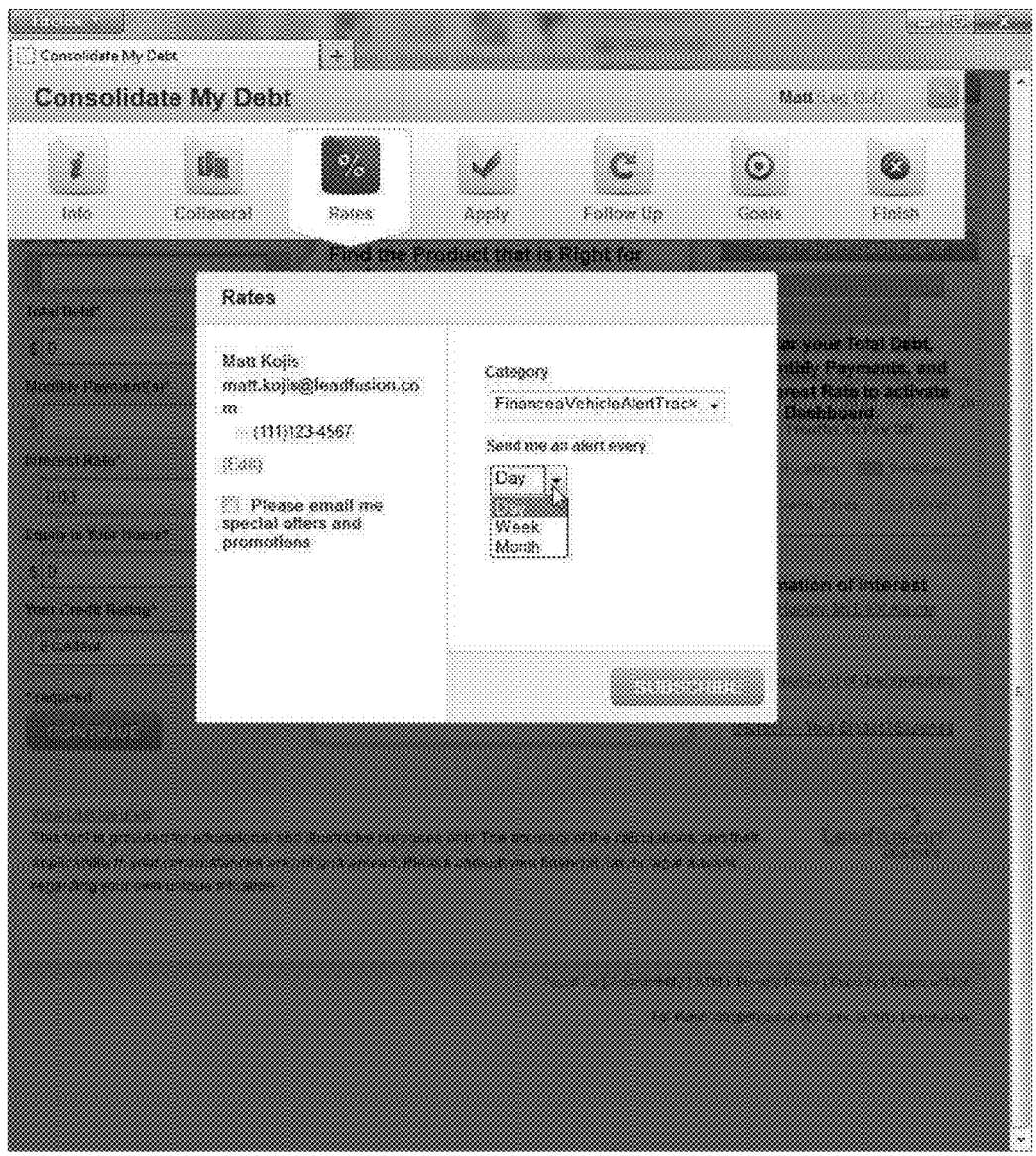
FIG. 10 shows a non-limiting example of a sales overlay adding functionality to a suite of financial product education, research, and recommendation tools; in this case, a sales overlay adapted for use by a financial service representative and including a GUI for providing a consumer with rate alerts.

Referring to FIG. 10, in a particular embodiment, a sales overlay is activated, adding functionality to a suite of financial product education, research, and recommendation tools. In this embodiment, the sales overlay includes optional access to tools for electronically providing a consumer with rate alerts associated with financial products and/or services. Further in this embodiment, a financial services representative optionally configures the category of alert and the frequency of the alert.

Figure 11:
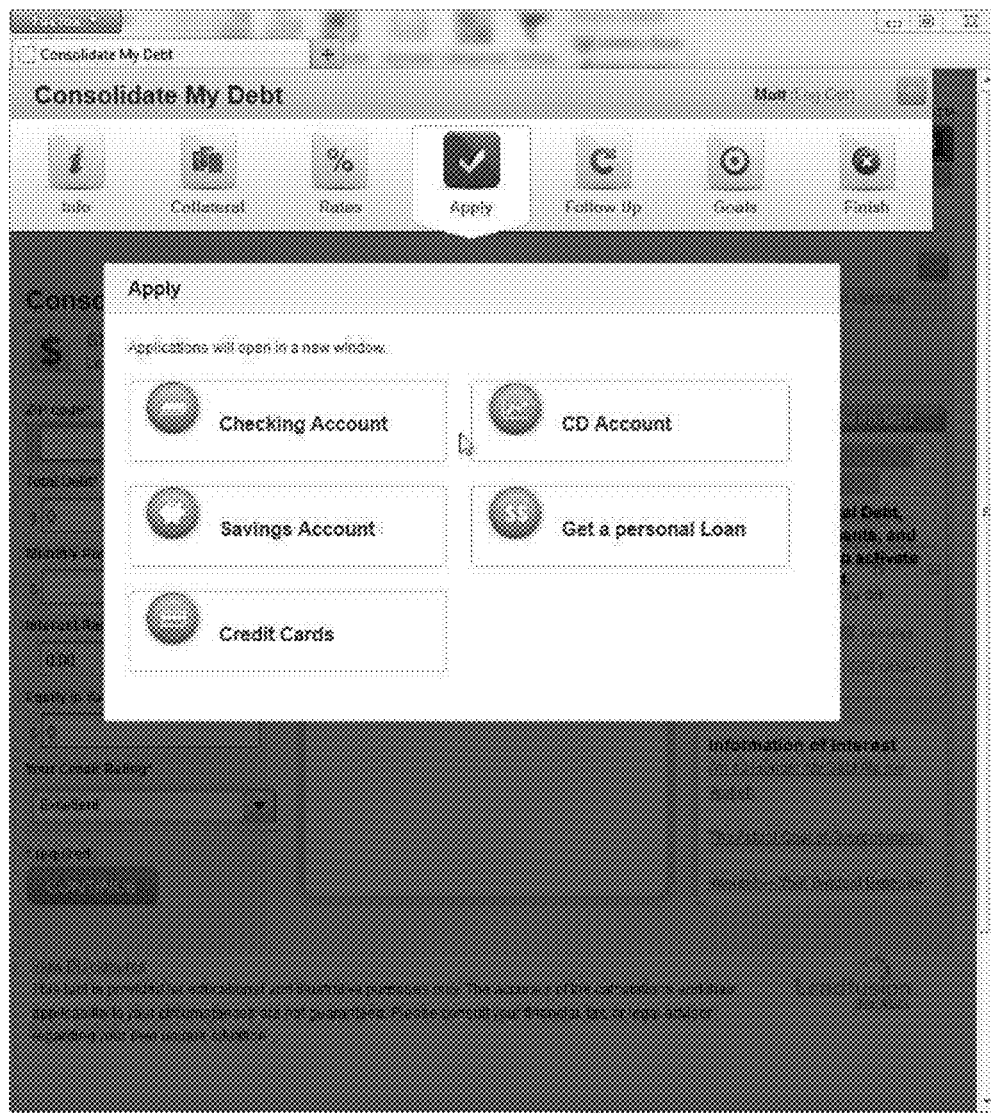
FIG. 11 shows a non-limiting example of a sales overlay adding functionality to a suite of financial product education, research, and recommendation tools; in this case, a sales overlay adapted for use by a financial service representative and including a GUI for applying for financial products.

Referring to FIG. 11, in a particular embodiment, a sales overlay is activated, adding functionality to a suite of financial product education, research, and recommendation tools. In this embodiment, the sales overlay includes optional access to tools for viewing and/or submitting applications for financial products.

Figure 12:
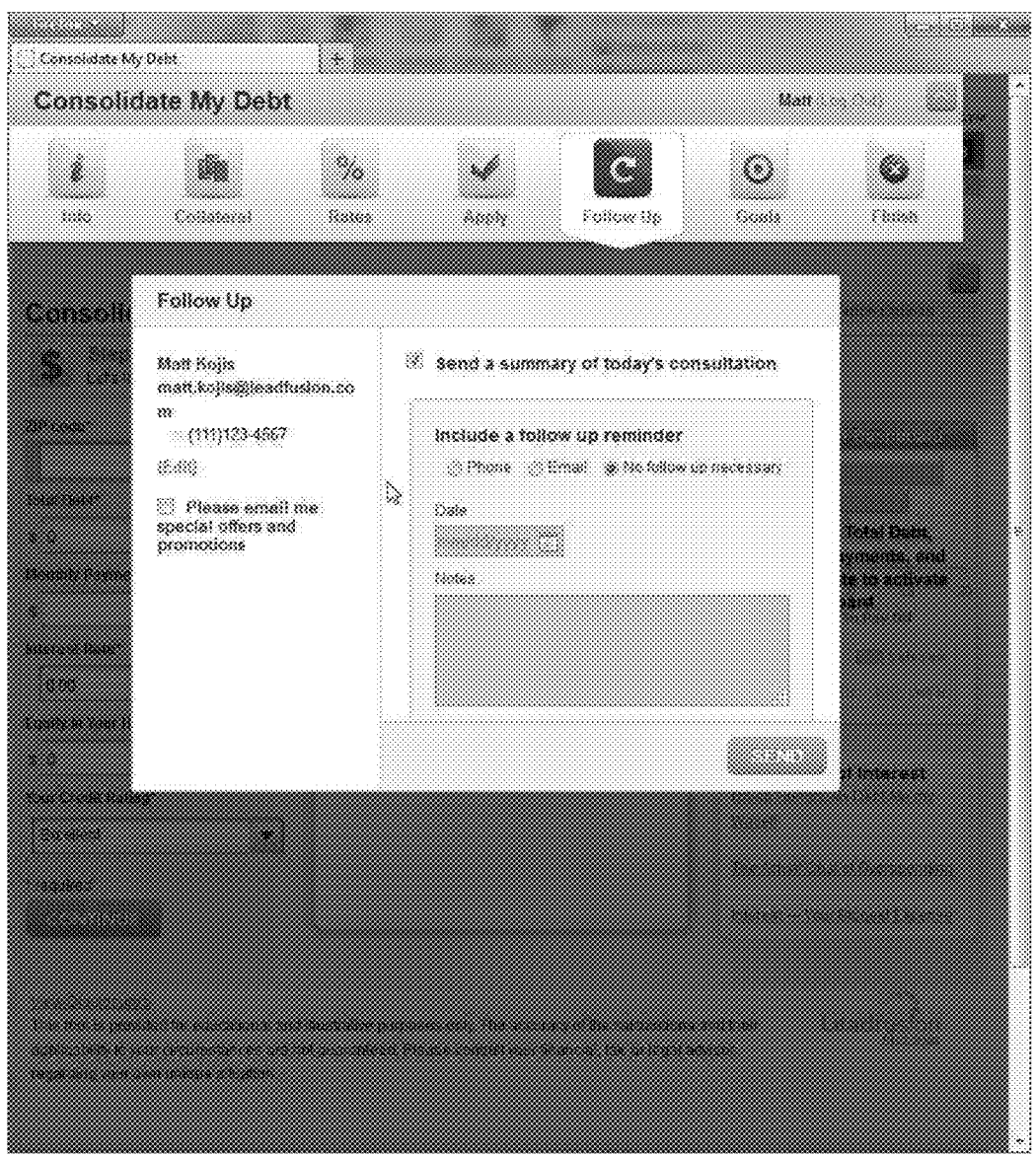
FIG. 12 shows a non-limiting example of a sales overlay adding functionality to a suite of financial product education, research, and recommendation tools; in this case, a sales overlay adapted for use by a financial service representative and including a GUI for providing a consumer with a collaboration summary.

Referring to FIG. 12, in a particular embodiment, a sales overlay is activated, adding functionality to a suite of financial product education, research, and recommendation tools. In this embodiment, the sales overlay includes optional access to tools for electronically providing a consumer with a collaboration summary.

Figure 13:
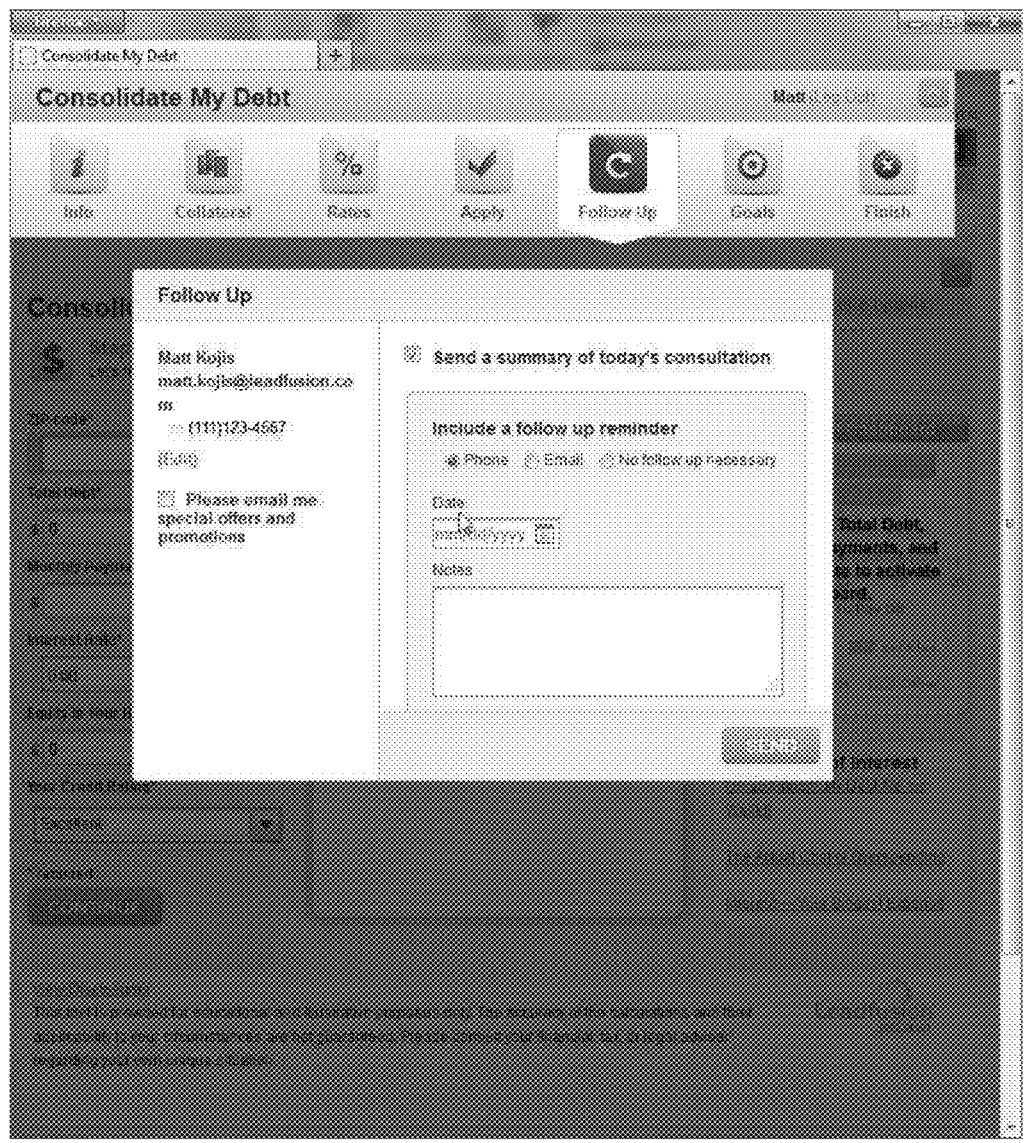
FIG. 13 shows a non-limiting example of a sales overlay adding functionality to a suite of financial product education, research, and recommendation tools; in this case, a sales overlay adapted for use by a financial service representative and including a GUI for providing a consumer with a collaboration summary and a follow-up reminder.

Referring to FIG. 13, in a particular embodiment, a sales overlay is activated, adding functionality to a suite of financial product education, research, and recommendation tools. In this embodiment, the sales overlay includes optional access to tools for electronically providing a consumer with a collaboration summary. Further, in this embodiment, a financial service representative simultaneously configures a follow up reminder including a mode of communication, a date, and any associated notes.

Figure 14:
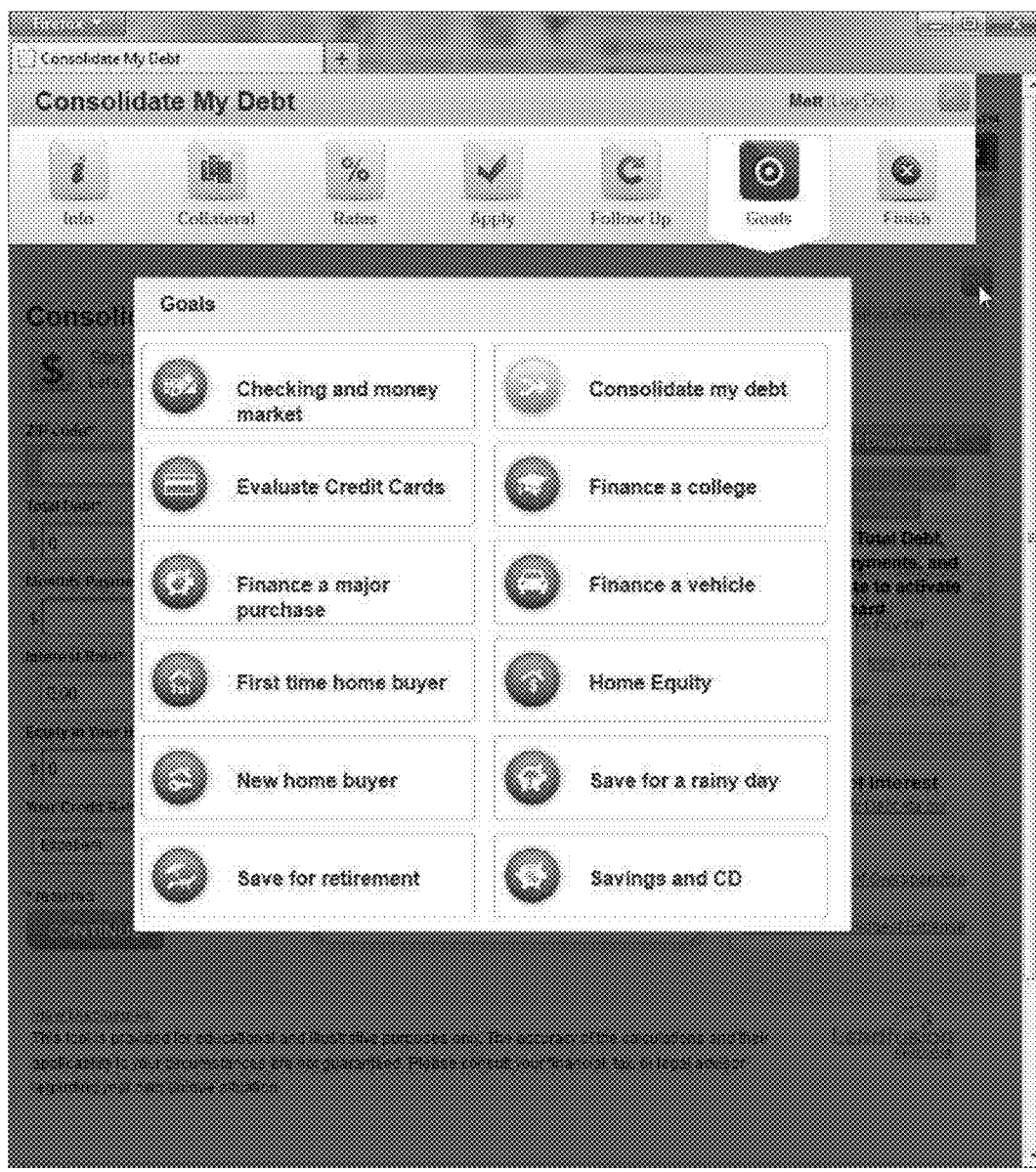
FIG. 14 shows a non-limiting example of a sales overlay adding functionality to a suite of financial product education, research, and recommendation tools; in this case, a sales overlay adapted for use by a financial service representative and including a GUI for starting or recalling additional consumer financial goals.

Referring to FIG. 14, in a particular embodiment, a sales overlay is activated, adding functionality to a suite of financial product education, research, and recommendation tools. In this embodiment, the sales overlay includes optional access to tools for recording consumer financial goals. Further, in this embodiment, configurable financial goals include those pertaining to checking and money market accounts, credit cards, major purchases, first time home purchase, new home purchase, retirement savings, debt consolidation, education finance, vehicle finance, home equity loans and lines of credit, savings accounts, and certificates of deposit.

Figure 15:
FIG. 15 shows a non-limiting example of a sales overlay adding functionality to a suite of financial product education, research, and recommendation tools; in this case, a sales overlay adapted for use by a financial service representative and including a GUI for providing a collaboration summary screen.

Referring to FIG. 15, in a particular embodiment, a sales overlay is activated, adding functionality to a suite of financial product education, research, and recommendation tools. In this embodiment, the sales overlay includes optional access to tools for displaying a collaboration summary screen.

Figure 16:
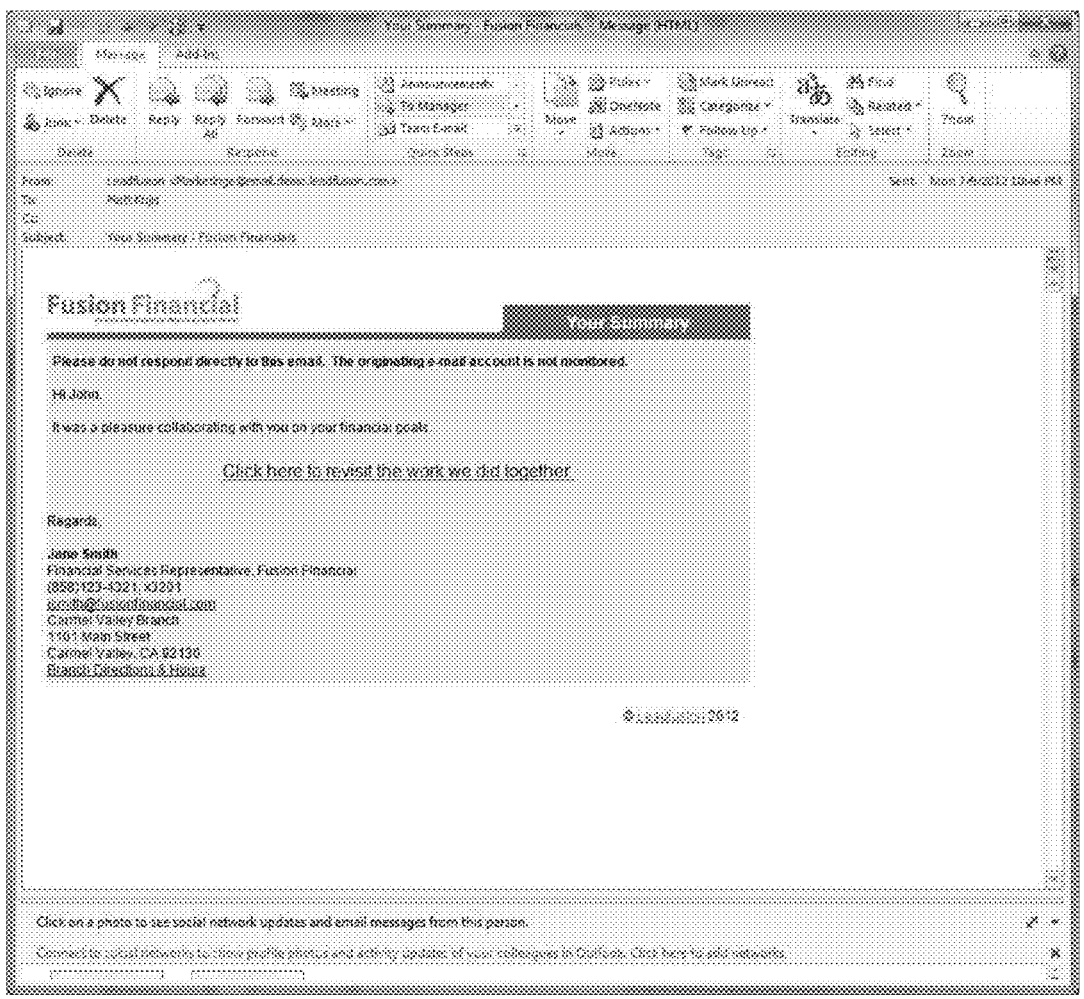
FIG. 16 shows a non-limiting example of a collaboration follow-up email for a consumer; in this case, a follow-up including access to a consumer/service representative collaboration summary.

Referring to FIG. 16, in a particular embodiment, a financial service representative has sent a collaboration follow-up email to a consumer. In this embodiment, the follow-up including access to a consumer/service representative collaboration summary.

Figure 17:
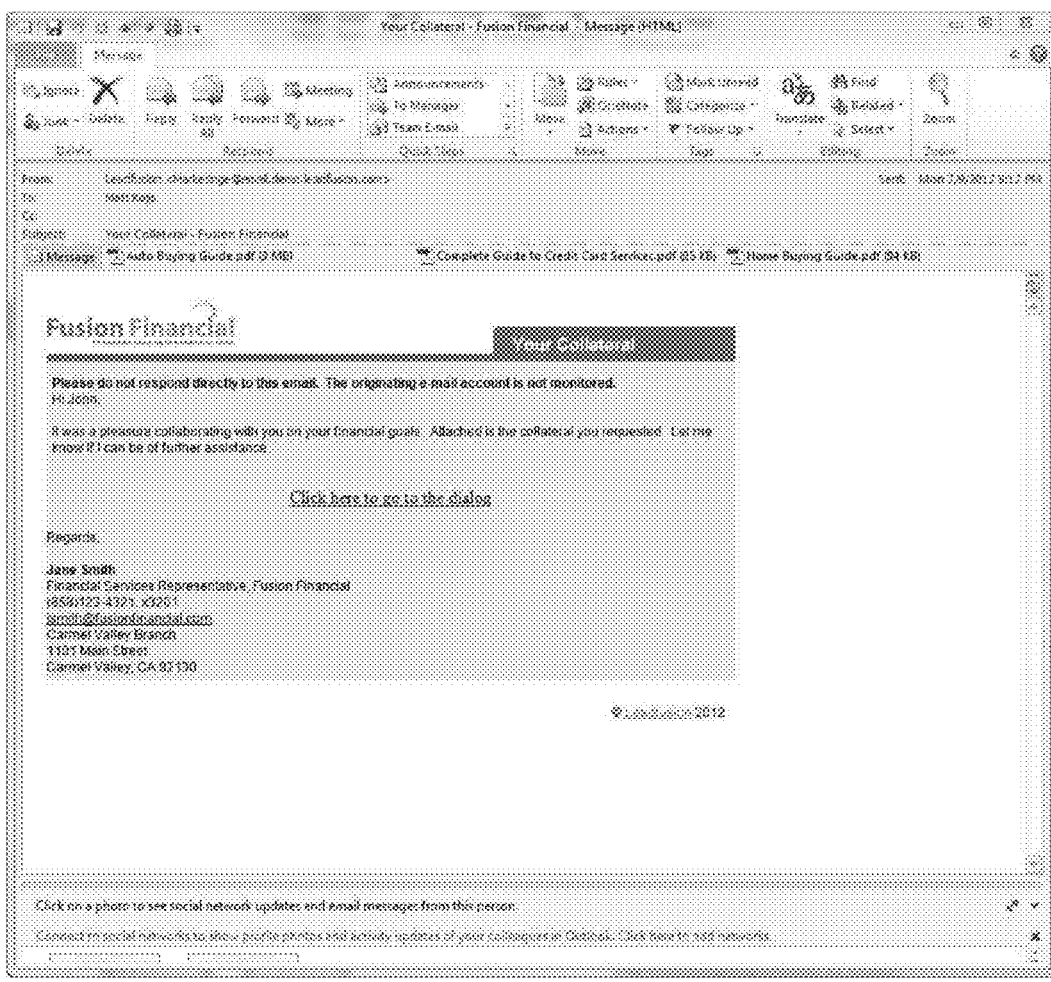
FIG. 17 shows a non-limiting example of a collaboration follow-up email for a consumer; in this case, a follow-up including access to requested financial product sales collateral.

Referring to FIG. 17, in a particular embodiment, a financial service representative has sent a collaboration follow-up email to a consumer. In this embodiment, the follow-up including access to requested financial product/service sales/marketing collateral.

Financial Service Representative Monitoring and Incentive Tools

In some embodiments, the software, systems, media, and methods described herein include a software modules configured to provide financial service representative monitoring and incentive tools, or use of the same. In further embodiments, financial service representative monitoring and incentive tools encourage effective use of the features of the software, systems, media, and methods described herein.

In some embodiments, the software, systems, media, and methods described herein comprise a software module configured to provide sales reports. Many metrics are suitable for inclusion in a sales report. In various embodiments, suitable metrics include, by way of non-limiting examples, service representative name, service representative location, number of new consumer profiles created, number of collaborative log-ins, number and type of collateral distributed, number and type of rate alerts configured, number and type of new product applications, complete, number and type of follow-up tasks and appointments configured, and the like. In some embodiments, sales reports are organized by, for example, service representative, location, financial product/service type, consumer, and the like.

In some embodiments, the software, systems, media, and methods described herein comprise a software module configured to provide games and selling contests to motivate, measure, and incent financial product sales representatives. In further embodiments, the same types of sales data and sales reports described herein are utilized to provide entertaining and motivating games and contests for financial service representatives. Many types of games and/or contests are suitable. In some embodiments, suitable games and/or contests include a scoreboard or leader board. In some embodiments, suitable games and/or contests include distribution of points for use in a token economy.

Methods

In some embodiments, provided herein are computer-implemented methods comprising the step of providing, by a computer, a question-based needs assessment for a financial product. In further embodiments, the question-based needs assessment includes a guided selling dialog, a financial calculator, or the like. In still further embodiments, the question-based needs assessment operates in a self-service mode adapted for use by a consumer.

In some embodiments, provided herein are computer-implemented methods comprising the step of providing, by a computer, a question-based needs assessment that operates in a collaboration mode. In further embodiments, a question-based needs assessment operating in a collaboration mode includes access to a sales overlay adapted for use by a sales representative. In some embodiments, the sales overlay includes access to, for example, marketing collateral for financial products, rate quotes and alerts for financial products, applications for financial products, a system for establishing follow-up appointments and actions, a system for sending a collaboration summary, and the like.

In some embodiments, provided herein are computer-implemented methods comprising the step of generating, by a computer, a unique code for the consumer. In further embodiments, the code provides persistence of state and data information between a self-service mode and a collaboration mode across, time, location, device, and interface, without authentication. Many forms are suitable for the code include, by way of non-limiting examples, numbers, letters, symbols, bar codes, and combinations thereof. In some embodiments, entry of the unique code pre-populates a question-based needs assessment with data and state information collected at a different point in time. In some embodiments, entry of the unique code pre-populates a question-based needs assessment, operating in a collaboration mode with data and state information collected in a self-service mode. In some embodiments, entry of the unique code pre-populates a question-based needs assessment, operating in a self-service mode with data and state information collected in a collaboration mode, including contact information for a sales representative with whom a consumer interacted in a collaboration mode.

The inventions disclosed herein include business methods. In some embodiments, the software, systems, media, and methods disclosed herein are marketed, advertised, and sold as, for example, products for facilitating sales of financial products and services. In further embodiments, the software, systems, media, and methods disclosed herein are marketed, advertised, and sold as, for example, white-label services for providing a bimodal system for selling financial products and services to meet the needs of a specific vendor. In other embodiments, the software, systems, media, and methods disclosed herein are marketed, advertised, and sold as, for example, services for providing a custom-built solutions for selling financial products and services to the specifications provided by a specific vendor. In further embodiments, the services are provided as platform as a service (PaaS). In further embodiments, the services are provided as software as a service (SaaS).

Digital Processing Device

In some embodiments, the software, systems, media, and methods described herein include a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

Computer Readable Storage Medium

In some embodiments, the software, systems, media, and methods disclosed herein include one or more computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the software, systems, media, and methods disclosed herein include at least one computer program, or use of the same. A computer program includes a sequence of instructions, executable in the digital processing device's CPU, written to perform a specified task. In light of the disclosure provided herein, those of skill in the art will recognize that a computer program may be written in various versions of various languages. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. A web application for providing a career development network for artists that allows artists to upload information and media files, in some embodiments, includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Software Modules

The software, systems, media, and methods disclosed herein include, in various embodiments, software, server, and database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

EXAMPLES

The following illustrative examples are representative of embodiments of the software applications, systems, and methods described herein and are not meant to be limiting in any way.

Example 1

Persistence from Self-Service Mode to Collaboration Mode

A consumer would like to learn about options to refinance her home. She uses her laptop computer to access a web application providing financial product education, research, and recommendation tools. The web application is a bimodal application, operating in a consumer self-service mode. After reading and learning about mortgage refinancing in general, she participates in a question-based needs assessment dialog to help her identify, compare, and review appropriate financial products. The consumer has lingering questions and would like the advice of a financial professional to assist her in making a decision. She clicks a button within the web application indicating she would like to meet with a financial services representative to review and discuss her research to date.

The web application presents a tool for the consumer to locate the nearest branch location and further offers tools to schedule an appointment with a financial services representative. Without requiring the consumer to create an account or provide any further information, the web application generates a unique code for the consumer, in the form of an eight character alphanumeric string. She writes the code down and takes it with her to her appointment.

At her scheduled appointment, the financial service representative logs into a specialized portal to access the financial product education, research, and recommendation tools. The web application is operating in a consumer/financial service representative collaboration mode. The service representative asks the consumer if she has a code to enter. She responds in the affirmative and the service representative types in her code. The financial product education, research, and recommendation tools populate with the state and data generated in the consumer's previous session. Together, the consumer and the financial service representative review the figures she entered and the refinance products recommended to her. During their collaborative session, the financial service representative activates a sales overlay extending the capabilities of the financial product education, research, and recommendation tools. Using the overlay, the service representative presents the consumer with sales collateral on her most preferred options. He also uses the overlay to send the consumer a summary of their discussion and to configure a rate alert email for the consumer.

Example 2

Persistence from Collaboration Mode to Self-Service Mode

A consumer is interested in options for financing his child's future education. He visits his local bank branch location and discusses his needs with a financial service representative. She uses a web application providing financial product education, research, and recommendation tools to record his goals, calculate his financial needs, and collect his pertinent financial information. The web application is a bimodal application, operating in a consumer/financial service representative collaboration mode. The web application recommends several financial products that are matched to the consumer's situation. The financial services representative uses a sales overlay that extends the functionality of the financial product education, research, and recommendation tools to show the consumer the application for his preferred 529 plan. The consumer indicates that he would like to do more research on his own before making a final decision. Without requiring the consumer to create an account or login, the service representative uses the web application to send a collaboration summary email to the consumer. The collaboration summary email includes a link embedded with a unique code to recall the work that they did together from any location or device.

A week later, at home, the consumer clicks on the link embedded with the unique code in the collaboration summary email to resume his research and product comparison where he left off with the financial service representative. The financial product education, research, and recommendation tools operate in a consumer self-service mode. The tools are populated with the data and recommendations that the consumer and the financial service representative produced in their previous collaborative session. The consumer makes some adjustments to the entered financial data and re-reviews the recommended products, comparing them on a number of parameters. Using the web application, the consumer applies for the same 529 plan he initially favored in his collaboration with the financial service representative.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. Non-transitory computer-readable storage media encoded with a computer program including instructions executable by a processor to create an application comprising:
    a. a software module configured to provide financial product education, research, and recommendation tools, the tools operating in a self-service mode adapted for use by a consumer;
    b. a software module configured to provide the financial product education, research, and recommendation tools, the tools operating in a collaboration mode, the collaboration mode comprising a sales overlay adapted for use by a sales representative together with the consumer, the sales overlay providing the sales representative with additional tools for selling the financial products to the consumer; and
    c. a software module configured to generate a unique code for the consumer, the code providing persistence of state and data information across locations and interfaces without authentication, wherein the code is generated in either the self-service mode or the collaboration mode and provides persistence of state and data information in a subsequent session in either mode.

2. The storage media of claim 1, wherein the financial education, research, and recommendation tools, operating in a collaboration mode and accessed via the unique code, comprise pre-populated data and state information collected in a self-service mode.

3. The storage media of claim 2, wherein the financial education, research, and recommendation tools, operating in a collaboration mode, are further accessible by means other than the unique code.

4. The storage media of claim 1, wherein the financial education, research, and recommendation tools, operating in a self-service mode and accessed via the unique code, comprise pre-populated data and state information collected in a collaboration mode.

5. The storage media of claim 4, wherein the financial education, research, and recommendation tools, operating in a self-service mode and accessed via the unique code, comprise contact information for a sales representative with whom a consumer interacted in a collaboration mode.

6. The storage media of claim 1, wherein the financial education, research, and recommendation tools include a question-based needs assessment dialog or a financial calculator.

7. The storage media of claim 1, wherein the financial product is one or more of: a mortgage product, a home equity loan, a home equity lines of credit, a small business loan, an auto loan, a personal loan, a personal line of credit, a savings account, a certificate of deposit, a checking account, a money market account, a credit card, a college savings product, a student loan, and a retirement savings plan.

8. The storage media of claim 1, wherein the unique code is an alphanumeric code, a linear bar code, or a two-dimensional bar code.

9. The storage media of claim 1, wherein the sales overlay includes access to one or more of: marketing collateral for financial products, rate quotes and alerts for financial products, applications for financial products, a system for establishing follow-up appointments and actions, a system for sending a collaboration summary, and a system for capturing consumer contact information.

10. The storage media of claim 1, wherein the application further comprises a software module configured to provide sales reports.

11. The storage media of claim 1, wherein the application further comprises a software module configured to provide games and selling contests to motivate, measure, and incent financial product sales representatives.

12. The storage media of claim 1, wherein the application further comprises a software module configured to provide a tool to find a sales representative based on location.

13. The storage media of claim 1, wherein the application is offered as software as a service.

14. A computer-implemented system comprising:
    a. a digital processing device comprising an operating system configured to perform executable instructions and a memory device;
    b. a computer program including instructions executable by the digital processing device to create an application comprising:
        i. a software module configured to provide financial product education, research, and recommendation tools, the tools operating in a self-service mode adapted for use by a consumer;
        ii. a software module configured to provide the financial product education, research, and recommendation tools, the tools operating in a collaboration mode, the collaboration mode comprising a sales overlay adapted for use by a sales representative together with the consumer, the sales overlay providing the sales representative with additional tools for selling the financial products to the consumer; and
        iii. a software module configured to generate a unique code for the consumer, the code providing persistence of state and data information across locations and interfaces without authentication, wherein the code is generated in either the self-service mode or the collaboration mode and provides persistence of state and data information in a subsequent session in either mode.

15. The system of claim 14, wherein the financial education, research, and recommendation tools, operating in a collaboration mode and accessed via the unique code, comprise pre-populated data and state information collected in a self-service mode.

16. The system of claim 15, wherein the financial education, research, and recommendation tools, operating in a collaboration mode, are accessible by means other than the unique code.

17. The system of claim 14, wherein the financial education, research, and recommendation tools, operating in a self-service mode and accessed via the unique code, comprise pre-populated data and state information collected in a collaboration mode.

18. The system of claim 17, wherein the financial education, research, and recommendation tools, operating in a self-service mode and accessed via the unique code, comprise contact information for a sales representative with whom a consumer interacted in a collaboration mode.

19. The system of claim 14, wherein the financial product education, research, and recommendation tools include a question-based needs assessment dialog or a financial calculator.

20. The system of claim 14, wherein the financial product is one or more of: a mortgage product, a home equity loan, a home equity lines of credit, a small business loan, an auto loan, a personal loan, a personal line of credit, a savings account, a certificate of deposit, a checking account, a money market account, a credit card, a college savings product, a student loan, and a retirement savings plan.

21. The system of claim 14, wherein the unique code is an alphanumeric code, a linear bar code, or a two-dimensional bar code.

22. The system of claim 14, wherein the sales overlay includes access to one or more of: marketing collateral for financial products, rate quotes and alerts for financial products, applications for financial products, a system for establishing follow-up appointments and actions, a system for sending a collaboration summary, and a system for capturing consumer contact information.

23. The system of claim 14, wherein the application further comprises a software module configured to provide sales reports.

24. The system of claim 14, wherein the application further comprises a software module configured to provide games and selling contests to motivate, measure, and incent financial product sales representatives.

25. The system of claim 14, wherein the application further comprises a software module configured to provide a tool to find a sales representative based on location.

26. The system of claim 14, wherein the application is offered as software as a service.

* * * * *